US010974566B2

(12) United States Patent
Kim

(10) Patent No.: US 10,974,566 B2
(45) Date of Patent: *Apr. 13, 2021

(54) HEAT PUMP SYSTEM FOR VEHICLE

(71) Applicants: Hyundai Motor Company, Seoul (KR); Kia Motors Corporation, Seoul (KR)

(72) Inventor: Jae Yeon Kim, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 77 days.

This patent is subject to a terminal disclaimer.

(21) Appl. No.: 16/554,906

(22) Filed: Aug. 29, 2019

(65) Prior Publication Data

US 2020/0338950 A1    Oct. 29, 2020

(30) Foreign Application Priority Data

Apr. 23, 2019  (KR) .......................... 10-2019-0047152

(51) Int. Cl.
*F25D 23/12* (2006.01)
*B60H 1/00* (2006.01)
(52) U.S. Cl.
CPC ..... *B60H 1/00278* (2013.01); *B60H 1/00921* (2013.01); *B60H 2001/00307* (2013.01); *B60H 2001/00928* (2013.01)

(58) Field of Classification Search
CPC ............ B60H 1/00278; B60H 1/00921; B60H 2001/00307; B60H 2001/00928
USPC ........................................ 62/259.2
See application file for complete search history.

(56) References Cited

U.S. PATENT DOCUMENTS

| 8,215,432 B2 | 7/2012 | Nemesh et al. |
| 8,899,062 B2 | 12/2014 | Kadle et al. |
| 9,109,840 B2 | 8/2015 | Kadle et al. |
| 9,239,193 B2 | 1/2016 | Kadle et al. |
| 2013/0283838 A1 | 10/2013 | Kadle et al. |
| 2020/0180390 A1* | 6/2020 | Kim .................. B60H 1/00921 |
| 2020/0180391 A1* | 6/2020 | Kim .................. B60H 1/00921 |
| 2020/0369108 A1* | 11/2020 | Kim ........................ B60H 1/03 |
| 2020/0398641 A1* | 12/2020 | Kim .................. B60H 1/00428 |

FOREIGN PATENT DOCUMENTS

| CN | 103380339 B | 1/2016 |
| JP | 5336033 B2 | 11/2013 |

* cited by examiner

*Primary Examiner* — Davis D Hwu
(74) *Attorney, Agent, or Firm* — Morgan, Lewis & Bockius LLP

(57) ABSTRACT

A heat pump system for a vehicle is configured to heart or cool a battery module according to a mode of the vehicle by use of one chiller in which a coolant and a refrigerant exchange heat in an electric vehicle, facilitating simplification of a system, and heat of outside air, and waste heat of a motor, an electrical component, and a battery module are selectively used in a heating mode of the vehicle, enhancing heating efficiency.

20 Claims, 8 Drawing Sheets

HEAT PUMP SYSTEM FOR VEHICLE

CROSS-REFERENCE TO RELATED APPLICATION

The present application claims priority to Korean Patent Application No. 10-2019-0047152 filed on Apr. 23, 2019, the entire contents of which is incorporated herein for all purposes by this reference.

BACKGROUND OF THE INVENTION

Field of the Invention

The present invention relates to a heat pump system for a vehicle, and more particularly, to a heat pump system for a vehicle which is used for heating or cooling a battery module by use of one chiller in which a refrigerant and a coolant exchange heat and enhancing heating efficiency by use of waste heat of a motor, an electrical component, and the battery module.

Description of Related Art

In general, an air conditioning system for a vehicle may include an air conditioning device configured for circulating a refrigerant to heat or cool an interior of the vehicle.

Such an air conditioning device which maintains a comfortable internal environment by keeping a temperature of the interior of the vehicle at an appropriate temperature regardless of a temperature change of the outside is configured to heat or cool the interior of the vehicle by heat-exchange by an evaporator while the refrigerant discharged by driving a compressor passes through a condenser, a receiver drier, an expansion valve, and the evaporator, and circulates to the compressor again.

That is, in the air conditioning device, high-temperature and high-pressure gaseous refrigerant compressed by the compressor is condensed through the condenser and thereafter is evaporated in the evaporator through the receiver drier and the expansion valve to lower a temperature and humidity of the internal in a summer cooling mode.

Meanwhile, in recent years, as interest in energy efficiency and environmental pollution has been increasing, there has been a demand for the development of environmentally friendly vehicles configured for substantially replacing internal combustion engine vehicles. The environmentally friendly vehicles are usually fuel cell or electric vehicles driven by electricity or a hybrid vehicle driven by an engine and a battery.

Among the environmentally friendly vehicles, the electric vehicle or the hybrid vehicle does not use a separate heater, unlike an air conditioner of a general vehicle, and the air conditioner applied to the environmentally friendly vehicle is generally referred to as a heat pump system.

On the other hand, in the case of the electric vehicle, chemical reaction energy of oxygen and hydrogen is converted into electrical energy to generate driving force. In the present process, since thermal energy is generated by the chemical reaction in the fuel cell, effectively removing the generated heat is essential in securing performance of the fuel cell.

Furthermore, even in the hybrid vehicle, a motor is driven by use of the electricity supplied from the fuel cell or an electric battery together with an engine that operates by general fuel to generate the driving force, and as a result, the performance of the motor may be secured only by effectively removing the heat generated from the fuel cell or the battery and the motor.

As a result, in the hybrid vehicle or the electric vehicle generally, a battery cooling system needs to be separately formed with a separate sealing circuit together with a cooler and the heat pump system to prevent the heat generation in the motor and electrical components, and the battery including the fuel cell.

Accordingly, the size and weight of a cooling module mounted in the front of the vehicle increase and a layout of connection pipes that supply the refrigerant and the coolant to the heat pump system, the cooler, and the battery cooling system is complicated in an engine compartment.

Furthermore, the battery cooling system which heats or cools the battery according to a status of the vehicle for the battery to show optimal performance is separately provided, and as a result, multiple valves for connection with the respective connection pipes are adopted and noise and vibration due to frequent opening/closing operations of the valves are transferred to the interior of the vehicle to degrade ride comfort.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a heat pump system for a vehicle which heats or cools a battery module by use of one chiller in which a coolant and a refrigerant exchange heat, facilitating simplification of a system.

The present invention, in various aspects, has also been made in an effort to provide a heat pump system for a vehicle which selectively utilizes outside air heat and waste heat of a motor, an electrical component, and a battery module in a heating mode of the vehicle, enhancing heating efficiency.

Various aspects of the present invention are directed to providing a heat pump system for a vehicle, which may include: a first cooling device including a first radiator and a first water pump connected through a first coolant line and configured of circulating a coolant in the first coolant line to cool at least one electrical component and at least one motor mounted on the first coolant line; a second cooling device including a second radiator and a second water pump connected through a second coolant line and configured of circulating the coolant in the second coolant line; a battery module provided on a battery coolant line selectively connectable to the second coolant line through a first valve mounted on the battery coolant line; and a chiller provided on the battery coolant line and through which the coolant passes, connected to a refrigerant line of an air-conditioning device through a refrigerant connection line, and configured of making the coolant which selectively flows exchange heat with a refrigerant supplied from the air-conditioning device to control a temperature of the coolant, wherein a main heat exchanger provided in the air-conditioning device is connected to each of the first and second coolant lines so that the coolant circulated in the first and second cooling devices passes through the first and second cooling devices, respectively, the refrigerant passing through the main heat exchanger primarily exchanges heat with the coolant supplied through the first coolant line and secondarily exchanges heat with the coolant supplied through the second coolant line, and the refrigerant discharged from the main heat exchanger is selectively supplied to the accumulator mounted on the refrigerant line, or the chiller, or an evaporator provided in the air-conditioning device through a third valve that operates according to modes of the vehicle.

The air-conditioning device may include: an HVAC module connected to the refrigerant line and having an opening/closing door configured for controlling outside air passing through the evaporator to selectively flow into an internal condenser according to cooling, heating, and dehumidifying modes of the vehicle; a compressor connected to the refrigerant line between the evaporator and the internal condenser; a first expansion valve provided on the refrigerant line connecting the main heat exchanger and the evaporator; a second expansion valve provided on the refrigerant connection line; a first bypass line connecting the main heat exchanger and the accumulator through the third valve so that the refrigerant passing through the main heat exchanger passes through the accumulator and selectively flows into the compressor through the refrigerant line; a third expansion valve provided on the refrigerant line between the internal condenser and the main heat exchanger; and a second bypass line connecting the refrigerant line between the main heat exchanger and the third expansion valve and the refrigerant line between the first expansion valve and the evaporator so that the refrigerant passing through the internal condenser selectively flows into the evaporator.

A sub-condenser may be provided on the refrigerant line between the main heat exchanger and the evaporator.

When the main heat exchanger condenses the refrigerant, the sub-condenser may additionally condense the refrigerant condensed by the main heat exchanger through heat exchange with the outside air.

The second expansion valve may be operated when the battery module is cooled by the refrigerant, and may expand the refrigerant which flows through the refrigerant connection line and make the expanded refrigerant to flow into the chiller.

The third expansion valve may selectively expand the refrigerant which flows into the main heat exchanger and the second bypass line in the heating and dehumidifying modes of the vehicle.

The first valve selectively may connect the second coolant line and the battery coolant line between the second radiator and the chiller, a first branch line connected to the first coolant line between the first radiator and the first water pump through a second valve provided on the first coolant line between the first radiator and the first water pump may be provided in the first cooling device, a second branch line connecting the chiller and the battery module through the first valve may be provided on the battery coolant line, a third branch line separating the battery coolant line and the second coolant line may be provided on the second coolant line, and a fourth valve may be provided on the second bypass line.

When the battery module is cooled by use of the coolant cooled by the second radiator, the first valve may connect the second coolant line and the battery coolant line and close the second branch lines, and the second valve may close the first branch line.

When the battery module is cooled in the cooling mode of the vehicle, in the first cooling device, the first branch line may be closed through the operation of the second valve and the coolant cooled by the first radiator is circulated to the electrical component and the motor through the operation of the first water pump, the second branch line may be opened through the operation of the first valve, the third branch line is opened, and connection between the second coolant line and the battery coolant line is closed by the opened second and third branch lines, and in the air-conditioning device, the refrigerant may be circulated along the refrigerant line while the first and second bypass lines are closed through the operations of the third and fourth valves and the second expansion valve is operated so that the expanded refrigerant flows into the chiller through the refrigerant connection line, and the third expansion valve may make the refrigerant pass to the main heat exchanger.

In the first cooling device, the coolant cooled by the first radiator may be supplied to the main heat exchanger through the operation of the first water pump, in the second cooling device, the opened third branch line may be connected to the second coolant line to form an independent closed circuit and the coolant cooled by the second radiator is supplied to the main heat exchanger through the operation of the second water pump, and the main heat exchanger may condense the refrigerant through heat exchange with the coolant.

When outside air heat is recovered in the heating mode of the vehicle, in the second cooling device, the coolant may be circulated to the second coolant line through an operation of the second water pump, the second branch line may be closed through the operation of the first valve, the third branch line is closed, and the second coolant line and the battery coolant line are connected by the closed second and third branch lines, the coolant passing through the second radiator may be supplied to the main heat exchanger through the operation of the second water pump, and in the air-conditioning device, the refrigerant line connecting the main heat exchanger and the evaporator and the refrigerant connection line may be closed through the operations of the first and second expansion valves, the refrigerant line connected to the evaporator may be closed through the operation of the third valve, and the first bypass line is opened through the operation of the third valve, the second bypass line may be closed through the operation of the fourth valve, and the third expansion valve may expand the refrigerant passing through the internal condenser and supplies the expanded refrigerant to the main heat exchanger.

When the heat of the outside air and the waste heat of the electrical component and the motor are recovered in the heating mode of the vehicle, in the first cooling device, the coolant may be circulated to the electrical component through the operation of the first water pump, while the first branch line may be opened through the operation of the second valve, the first coolant line connecting the electrical component, the motor, and the first radiator is closed, and in the second cooling device, the coolant may be circulated to the second coolant line through an operation of the second water pump, the second branch line may be closed through the operation of the first valve, the third branch line is opened, and connection between the second coolant line and the battery coolant line is closed by the opened third branch line, while in the air-conditioning device, the refrigerant line connecting the main heat exchanger and the evaporator and the refrigerant connection line may be closed through the operations of the first and second expansion valves, the first bypass line may be opened through the operation of the third valve, the second bypass line may be closed through the operation of the fourth valve, and the third expansion valve may expand the refrigerant and supplies the expanded refrigerant to the main heat exchanger.

When the waste heat of the electrical component and the motor is recovered in the heating mode of the vehicle, in the first cooling device, the coolant may be circulated to the electrical component through the operation of the first water pump, while the first branch line may be opened through the operation of the second valve, the first coolant line connecting the electrical component, the motor, and the first radiator is closed, and in the second cooling device, the operation of the second water pump may stop, the operation of the third water pump may stop, and the second branch line may be closed through the operation of the first valve and the third branch line is closed, while in the air-conditioning device, the refrigerant line connecting the main heat exchanger and the evaporator may be closed through the operation of the first expansion valve, the first bypass line may be opened through the operation of the third valve, the second bypass line may be closed through the operation of the fourth valve, and the third expansion valve may expand the refrigerant and supplies the expanded refrigerant to the main heat exchanger.

When the waste heat of the battery module is recovered during charging in the heating mode of the vehicle, in the first cooling device, the coolant may be circulated to the electrical component through the operation of the first water pump, while the first branch line may be opened through the operation of the second valve, the first coolant line connecting the electrical component, the motor, and the first radiator is closed, in the second cooling device, the operation of the second water pump may stop, the operation of the third water pump may stop, and the second branch line may be closed through the operation of the first valve and the third branch line is closed, while in the air-conditioning device, the refrigerant line connecting the main heat exchanger and the evaporator may be closed through the operation of the first expansion valve, the first bypass line may be opened through the operation of the third valve, the second bypass line may be closed through the operation of the fourth valve, and the third expansion valve may expand the refrigerant and supplies the expanded refrigerant to the main heat exchanger.

The third valve may supply the refrigerant to the accumulator through the opened first bypass line such that the gaseous refrigerant in the refrigerant supplied to the accumulator is supplied to the compressor, and the third valve may open the refrigerant line connected to the refrigerant connection line so that the refrigerant is supplied to the chiller.

In the heating and dehumidifying mode of the vehicle, in the first cooling device, the coolant may be circulated to the electrical component through the operation of the first water pump, while the first branch line may be opened through the operation of the second valve, the first coolant line connecting the electrical component, the motor, and the first radiator may be closed, each of the operations of the second water pump and the third water pumps may stop, and in the air-conditioning device, the refrigerant line connecting the main heat exchanger and the evaporator and the refrigerant connection line may be closed through the operations of the first and second expansion valves, the first bypass line may be opened through the operation of the third valve, the second bypass line may be opened through the operation of the fourth valve, and the third expansion valve may expand the refrigerant and supplies each of the main heat exchanger and the evaporator through the second bypass line.

The second and third expansion valves may be electronic expansion valves that selectively expand the refrigerant while controlling the flow of the refrigerant.

The main heat exchanger may include a first heat dissipation unit connected to the first coolant line, a second heat dissipation unit connected to the second coolant line, and a partition partitioning the inside of the condenser into the first heat dissipation unit and the second heat dissipation unit to prevent the coolants supplied from the first and second cooling devices, respectively, from being mixed and allowing the refrigerant to pass therethrough.

The main heat exchanger may condense or evaporate the refrigerant according to the modes of the vehicle.

The accumulator may be mounted on the refrigerant line between the compressor and the evaporator.

As described above, according to an exemplary embodiment of the present invention, by a heat pump system for a vehicle, a battery module is heated or cooled according to a mode of the vehicle by use of one chiller in which a coolant and a refrigerant exchange heat in an electric vehicle, facilitating simplification of a system.

Furthermore, according to an exemplary embodiment of the present invention, the battery module is efficiently heated or cooled according to the modes of the vehicle, facilitating optimal performance of the battery module and increasing an overall driving distance of a vehicle through efficient battery module management.

Furthermore, according to an exemplary embodiment of the present invention, heat of outside air, and waste heat of a motor, an electrical component, and a battery module is selectively used in a heating mode of the vehicle, enhancing heating efficiency.

Furthermore, according to an exemplary embodiment of the present invention, condensation or evaporation performance of the refrigerant is increased through a main heat exchanger that dually condenses or evaporates the refrigerant by use of the coolant supplied from each of first and second cooling devices, enhancing cooling performance and reducing power consumption of a compressor.

Furthermore, according to an exemplary embodiment of the present invention, manufacturing cost may be reduced and a weight may be reduced through simplification of an entire system, and spatial utilization may be enhanced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
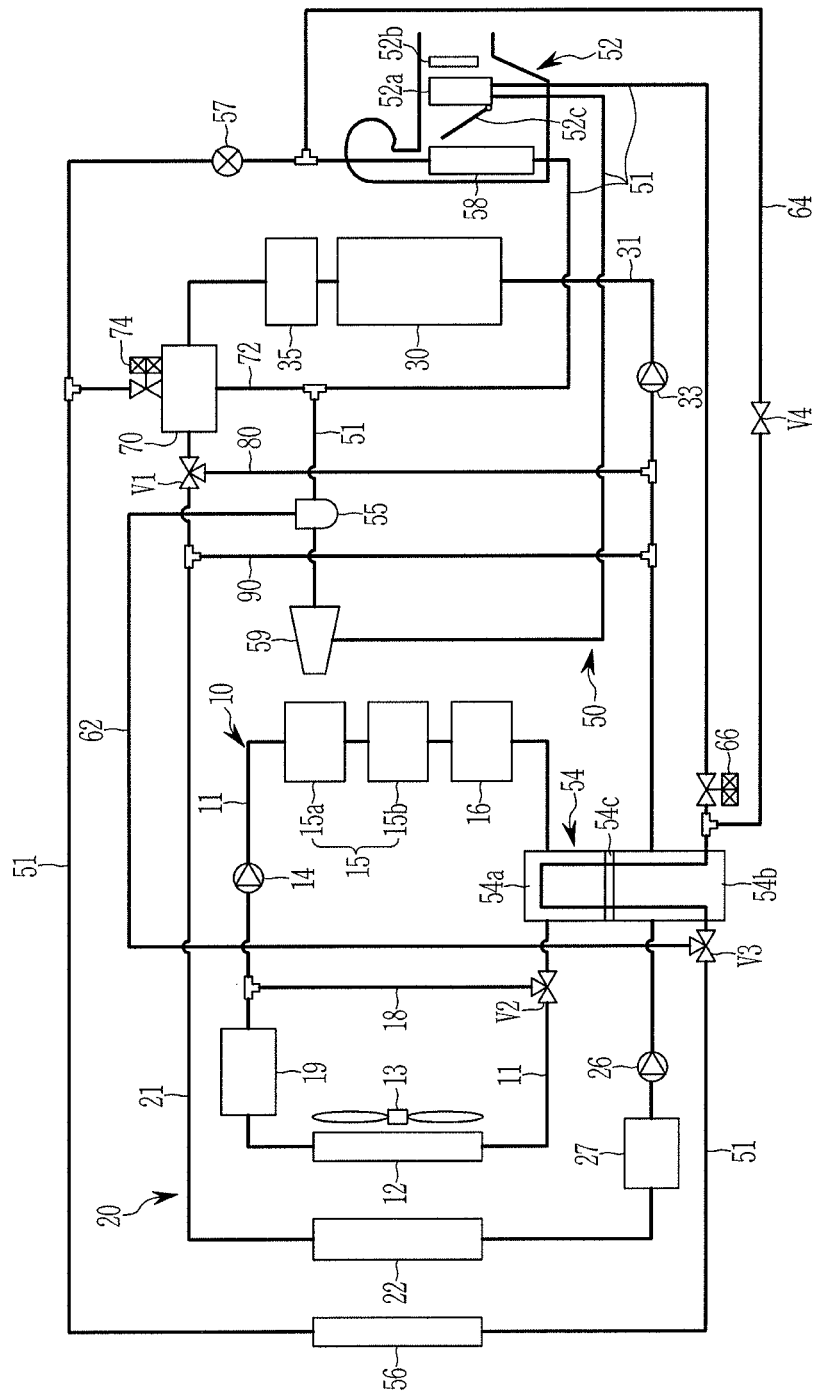
FIG. 1 is a block diagram of a heat pump system for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

An exemplary embodiment of the present invention will hereinafter be described in detail with reference to the accompanying drawings.

Prior to this, configurations illustrated in the exemplary embodiments and drawings included in the exemplary embodiment are only exemplary embodiments and do not represent all of the technical spirit of the present invention, and thus it is to be understood that various equivalents and modified examples, which may replace the configurations, are possible when filing the present application.

To clearly illustrate the present invention, parts not related to the description are omitted, and the same or similar components are denoted by the same reference numerals throughout the specification.

Since size and thickness of each component illustrated in the drawings are arbitrarily represented for convenience in explanation, the present invention is not limited to the illustrated size and thickness of each component, and the thickness is enlarged and illustrated to clearly express various parts and areas.

Throughout the specification, unless explicitly described to the contrary, the word "comprise" and variations such as "comprises" or "comprising" will be understood to imply the inclusion of stated elements but not the exclusion of any other elements.

Furthermore, the terms "unit", "means", "part", and "member", which are described in the specification, mean a unit of a comprehensive configuration that performs at least one function or operation.

FIG. 1 is a block diagram of a heat pump system for a vehicle according to an exemplary embodiment of the present invention.

A heat pump system for a vehicle according to an exemplary embodiment of the present invention may heat or cool a battery module 30 by use of one chiller 70 in which a refrigerant and a coolant exchange heat and enhance heating efficiency by use of waste heat of a motor 16, an electrical component 15, and the battery module 30.

Here, in the heat pump system, a first cooling device 10 for cooling the electrical component 15 and the motor 16, a second cooling device 20 for cooling the battery module 30, and an air conditioning device 50 which is for cooling or heating an interior may interlock with each other in the electric vehicle.

That is, referring to FIG. 1, the heat pump system may include the first and second cooling devices 10 and 20, the battery module 30, and the chiller 70.

First, the first cooling device 10 may include a first radiator 12 and a first water pump 14 connected through a first coolant line 11. The first cooling device 10 circulates a coolant to the first coolant line 11 by operating the first water pump 14 to cool the electrical component 15 and the motor 16.

The first radiator 12 is mounted in the front of the vehicle, and a cooling fan 13 is provided behind the first radiator to cool the coolant through the operation of the cooling fan 13 and heat exchange with outside air.

Here, the electrical component 15 may include a power control device, an inverter 15a, or an on board charger (OBC) 15b. The power control device and the inverter 15a may dissipate heat while driving, and the OBC 15b may dissipate heat when the battery module 30 is charged.

The electrical component 15 and the motor 16 may be mounted on the first coolant line 11 in series.

Furthermore, a first reservoir tank 19 is provided on the first coolant line 11 between the first radiator 12 and the first water pump 14. The coolant cooled by the first radiator 12 may be stored in the first reservoir tank 19.

The first cooling device 10 configured as such circulates the coolant cooled by the first radiator 12 along the first coolant line 11 by operating the first water pump 14 to cool the electrical component 15 and the motor 16 to not be overheated.

In the exemplary embodiment of the present invention, the second cooling device 20 includes a second radiator 22 and a second water pump 26 connected through a second coolant line 21, and circulates the coolant to the second coolant line 21.

The second cooling device 20 may selectively supply the coolant cooled by the second radiator 22 to the battery module 30.

The second radiator 22 is mounted in front of the first radiator 12 and cools the coolant through the operation of the cooling fan 13 and heat exchange with the outside air.

Furthermore, a second reservoir tank 27 is provided on the second coolant line 21 between the second radiator 22 and the second water pump 26. The coolant cooled by the second radiator 22 may be stored in the second reservoir tank 27.

The second cooling device 20 configured as such may circulate the coolant cooled by the second radiator 22 along the second coolant line 21 by operating the second water pump 26.

In the exemplary embodiment of the present invention, the battery module 30 is provided on a battery coolant line 31 selectively connectable to the second coolant line 21 through a valve V1.

Here, the valve V1 may selectively connect the second coolant line 21 and the battery coolant line 31 between the second radiator 22 and the battery module 30.

The first valve V1 selectively connects the second coolant line 21 and the battery coolant line 31 between the chiller 70 and the second radiator 22 provided to the battery coolant line 31.

Here, the battery module 30 is formed as a water-cooled type in which electric power is supplied to the electrical component 15 and the motor 16, which are cooled by the coolant flowing along the battery coolant line 31.

That is, the battery module 30 is selectively connectable to the second cooling device 20 through the battery coolant line 31 according to the operation of the valve V1. Furthermore, in the battery module 30, the coolant may be circulated through the operation of a third water pump 33 provided on the battery coolant line 31.

The third water pump 33 is provided on the battery coolant line 31 between the chiller 70 and the battery module 30. The third water pump 33 operates to circulate the coolant through the battery coolant line 31.

Here, the first, second, and third water pumps 14, 26, and 33 may be electric water pumps.

Meanwhile, the first cooling device 10 may include a first branch line 18 connected to the first coolant line 11 between the first radiator 12 and the first water pump 14 through a second valve V2 on the first coolant line 11 between the first radiator 12 and the first water pump 14.

The second valve V2 is provided on the first coolant line 11 between the electrical component 15, the motor 16, and the first radiator 12.

One end portion of the first branch line 18 is connected to the first coolant line 11 through the second valve V2, and the other end portion of the first branch line 18 may be connected to the first coolant line 11 between the first radiator 12 and the first water pump 14.

When the temperature of the coolant is raised by absorbing the waste heat generated from the electrical component 15 and the motor 16, the first branch line 18 is selectively opened through the operation of the second valve V2. In the instant case, the first coolant line 11 connected to the first radiator 12 is closed through the operation of the second valve V2.

In the exemplary embodiment of the present invention, the chiller 70 is provided on the battery coolant line 31 and the coolant passes through the inside of the chiller 70, and the chiller 70 is connected to a refrigerant line 51 of the air-conditioning device 50 through a refrigerant connection line 72.

The chiller 70 makes the coolant selectively flowing into the chiller 60 exchange heat with the refrigerant supplied from the air-conditioning device 50 to control a temperature of the coolant. Here, the chiller 70 may be a water-cooled type of heat exchanger in which coolant flows into the chiller.

A heater 35 may be provided on the battery coolant line 31 between the battery module 30 and the chiller 70.

When the temperature of the battery module 30 is required to be raised, the heater 35 is turned on to heat the coolant circulated in the battery coolant line 31 so that the coolant of which temperature is raised is made to flow into the battery module 30.

The heater 35 may be an electric heater that operates according to supply of electric power.

Furthermore, a second branch line 80 may be provided on the battery coolant line 31, which connects each battery coolant line 31 between the chiller 70 and the battery module 30 through the valve V1.

Furthermore, a third branch line 90 is provided on the second coolant line 21, which separates the battery coolant line 31 and the second coolant line 21 from each other.

The third branch line 90 may be selectively connectable to the second coolant line 21 so that the second cooling device 20 forms an independent closed circuit through the second coolant line 21.

Meanwhile, a separate valve may be provided at a point where the third branch line 90 intersects the second coolant line 21 and the battery coolant line 31 or on the third branch line 90. Such a valve may be a 3-way or a 2-way valve.

As a result, the valve V1 selectively connects the second coolant line 21 and the battery coolant line 31 or selectively connects the battery coolant line 31 and the second branch line 80 to control the flow of the coolant.

That is, when the battery module 30 is cooled using the coolant cooled by the second radiator 22, the valve V1 may connect the second coolant line 21 connected to the second radiator 22 and the battery coolant line 31 and close the second branch line 80.

As such, the coolant cooled by the second radiator 22 may cool the battery module 30 while flowing along the second coolant line 11 and the battery coolant line 31 connected through the operation of the first valve V1.

Furthermore, when the battery module 30 is cooled by use of the coolant which exchanges heat with the refrigerant, the valve V1 may open the second branch line 80 and close the connection between the second coolant line 21 and the battery coolant line 31.

Accordingly, low-temperature coolant that has exchanged heat with the refrigerant in the chiller 70 flows into the battery module 30 through the second branch line 80 opened by the valve V1, efficiently cooling the battery module 30.

On the other hand, when the battery module 30 is heated, the coolant circulated along the battery coolant line 31 is prevented from flowing into the second radiator 22 through the operation of the valve V1 to make the coolant heated through the operation of the heater 35 flow into the battery module 30, rapidly heating the battery module 30.

Meanwhile, in the exemplary embodiment of the present invention, it is described that the valve is not configured in the third branch line 90 as an exemplary embodiment of the present invention, but the present invention is not limited thereto and the valve is applicable as necessary for selective opening of the third branch line 90.

That is, the third branch line 90 may control a flow rate of the coolant circulated through the operations of the second coolant line 21, the battery coolant line 31, and the second branch line 80 selectively connectable according to each mode (heating, cooling, or dehumidifying) of the vehicle and the second and third water pumps 26 and 33, controlling opening and closing of the third branch line 90.

Meanwhile, in the exemplary embodiment of the present invention, the air-conditioning device 50 includes a Heating, Ventilation, and Air Conditioning (HVAC) module 52, a main heat exchanger 54, an accumulator 55, a first expansion valve 57, an evaporator 58, and a compressor 59 connected through the refrigerant line 51.

First, the HVAC module 52 has therein an opening/closing door 52c connected through the refrigerant line 51 and controlling the outside air passing through the evaporator 58 to selectively flow into an internal condenser 52a and an internal heater 52b according to the heating, cooling, and heating/humidifying modes of the vehicle.

That is, the opening/closing door 52c is opened so that the outside air passing through the evaporator 58 flows into the internal condenser 52a and the internal heater 52b in the heating mode of the vehicle. On the other hand, in the cooling mode of the vehicle, the opening/closing door 52c closes the internal condenser 52a and the internal heater 52b so that the outside air which is cooled while passing through the evaporator 58 directly flows to the inside of the vehicle.

The main heat exchanger 54 is connected to the refrigerant line 51 so that the refrigerant passes through the refrigerant line 51 and the main heat exchanger 54 is connected to each of the first and second coolant lines 11 and 21 so that the coolant circulated in each of the first and second cooling devices 10 and 20 passes through the main heat exchanger 54.

The main heat exchanger 54 may condense or evaporate the refrigerant through heat exchange with the coolant supplied through the first and second coolant lines 11 and 21 according to the modes of the vehicle. That is, the main heat exchanger 54 may be a water-cooled type of heat exchanger in which the coolant flows to the inside of the main heat exchanger 54.

Here, the main heat exchanger 54 may include a first heat dissipation unit 54a, a second heat dissipation unit 54b, and a partition 54c.

First, the first heat dissipation unit 54a is connected to the first coolant line 11. As a result, the first heat dissipation unit 54a may make the refrigerant supplied from the compressor 59 to primarily exchange heat with the coolant supplied from the first cooling device 10.

The second heat dissipation unit 54b is connected to the second coolant line 21. As a result, the second heat dissipation unit 54b may make the refrigerant passing through the first heat dissipation unit 54a to secondarily exchange heat with the coolant supplied from the second cooling device 20.

Furthermore, the partition 54c may partition the inside of the main heat exchanger 54 into the first heat dissipation unit 54a and the second heat dissipation unit 54b to prevent the coolant supplied from each of the first cooling device 10 and the second cooling device 20 from being mixed. The partition 54c may make the refrigerant pass so that the refrigerant flows into the second heat dissipation unit 54b from the first heat dissipation unit 54a.

Therefore, the refrigerant that passes through the main heat exchanger 54 may primarily exchange heat with the coolant supplied through the first coolant line 11 and secondarily exchange heat with the coolant supplied through the second coolant line 21.

The main heat exchanger 54 configured as described above makes the refrigerant supplied from the compressor 59 through the internal condenser 52a primarily exchange heat with the coolant supplied from the first cooling device 10 in the first heat dissipation unit 54a.

As such, the main heat exchanger 54 makes the refrigerant secondarily exchange heat with the coolant supplied from the second cooling device 20 in the second heat dissipation unit 54b. Through such an operation, the main heat exchanger 54 may lower the temperature of the refrigerant and increase a condensation amount or an evaporation amount.

In the exemplary embodiment of the present invention, the accumulator 55 is selectively supplied with the refrigerant discharged from the main heat exchanger 54 through a third valve V3 operates according to the modes of the vehicle.

The accumulator 55 supplies only a gaseous refrigerant to the compressor 59 to improve efficiency and durability of the compressor 59.

Meanwhile, a sub-condenser 56 for additionally condensing the refrigerant passing through the main heat exchanger 54 may be provided on the refrigerant line 51 between the main heat exchanger 54 and the evaporator 58.

The refrigerant passing through the main heat exchanger 54 may selectively inflow in the sub-condenser 56 according to the operation of the third valve V3.

That is, the sub-condenser 56 is mounted in front of the second radiator 22, and exchanges heat between the refrigerant flowing into the sub-condenser 56 and the outside air.

Accordingly, when the main heat exchanger 54 condenses the refrigerant, the sub-condenser 56 further condenses the refrigerant condensed by the main heat exchanger 54 to increase sub-cooling of the refrigerant, and as a result, a coefficient of performance (COP) which is a coefficient of cooling performance to power required by the compressor may be enhanced.

In the exemplary embodiment of the present invention, the first expansion valve 57 is provided on the refrigerant line 51 connecting the sub-condenser 56 and the evaporator 58. The first expansion valve 57 receives and expands the refrigerant passing through the sub-condenser 56. The first expansion valve 57 may be a mechanical expansion valve.

The compressor 59 is connected between the evaporator 58 and the main heat exchanger 54 through the refrigerant line 51. The compressor 59 may compress the gaseous refrigerant and supply the compressed refrigerant to the internal condenser 52a.

The air-conditioning device 50 configured as such may further include a second expansion valve 74, a first bypass line 62, a third expansion valve 66, and a second bypass line 64.

First, the second expansion valve 74 is provided on the refrigerant connection line 72 between the sub-condenser 56 and the chiller 70.

Here, the second expansion valve 74 is operated when the battery module 30 is cooled by the refrigerant in the cooling mode of the vehicle. The second expansion valve 74 may expand the refrigerant flowing through the refrigerant connection line 72 and make the expanded refrigerant flow into the chiller 70.

That is, the second expansion valve 74 expands the condensed refrigerant discharged from the sub-condenser 56 and makes the expanded refrigerant flow into the chiller 70 in a state where the refrigerant is lowered in temperature, further lowering a water temperature of the coolant passing through the inside the chiller 70.

Accordingly, the coolant having the lowered water temperature flows into the battery module 30 while passing through the chiller 70, so that the battery module 30 may be cooled more efficiently.

In the exemplary embodiment of the present invention, the first bypass line 62 connects the main heat exchanger 54 and the accumulator 55 through the third valve V3 so that the refrigerant passing through the main heat exchanger 54 passes through the accumulator 55 and selectively flows into the compressor 59.

That is, the third valve V3 may selectively open the first bypass line 62 according to the modes of the vehicle.

Here, the accumulator 55 may supply the gaseous refrigerant to the compressor 59, among the refrigerant supplied through the first bypass line 62 opened through the operation of the third valve V3.

In the exemplary embodiment of the present invention, the third expansion valve 66 is provided on the refrigerant line 51 between the internal condenser 52a and the main heat exchanger 54.

The third expansion valve 66 may selectively expand the refrigerant which flows into the main heat exchanger 54 and the second bypass line 64 in the heating and dehumidifying modes of the vehicle.

Furthermore, the second bypass line 64 may connect the refrigerant line 51 between the main heat exchanger 54 and the third expansion valve 66 and the refrigerant line 51 between the first expansion valve 57 and the evaporator 58 so that some refrigerants of the refrigerants passing through the internal condenser 52a selectively flows into the evaporator 58.

Here, a fourth valve V4 may be provided on the second bypass line 64. The fourth valve V4 may selectively open the second bypass line 64 according to the modes of the vehicle.

That is, the second expansion valve 74 and the third expansion valve 66 may be electronic expansion valves that selectively expand the refrigerant while controlling the flow of the refrigerant.

Furthermore, the first, second, and third valves V1, V2, and V3 may be three-way valves configured for distributing the flow, and the fourth valve V4 may be 2-way valves.

Hereinafter, the operation and action of the heat pump system for a vehicle according to the exemplary embodiment of the present invention configured as such will be described in detail with reference to FIG. 2, FIG. 3, FIG. 4, FIG. 5, FIG. 6, FIG. 7, and FIG. 8.

First, an operation when the battery module is cooled using the coolant in the heat pump system for a vehicle according to the exemplary embodiment of the present invention will be described with reference to FIG. 2.

Figure 2:
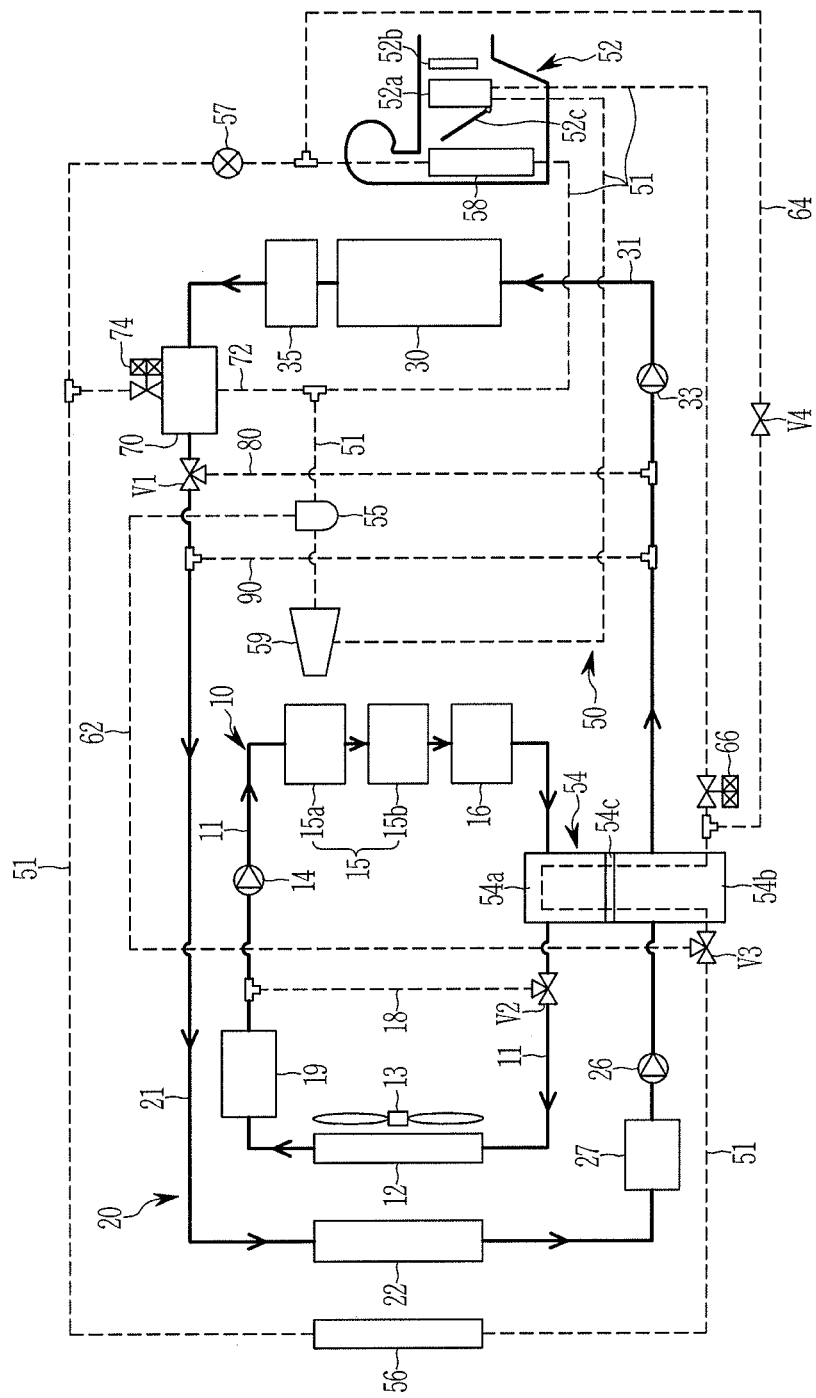
FIG. 2 is an operation state view at the time of cooling a battery module using a coolant in the heat pump system for a vehicle according to an exemplary embodiment of the present invention.

FIG. 2 is an operation state view at the time of cooling a battery module using a coolant in the heat pump system for a vehicle according to an exemplary embodiment of the present invention.

Referring to FIG. 2, in the first cooling device 10, the first water pump 14 is operated to cool the electrical component 15 and the motor 16. Accordingly, the coolant cooled by the first radiator 12 is circulated in the electrical component 15 and the motor 16.

Here, the second valve V2 may close the first branch line 18.

In the second cooling device 20, the second water pump 26 is operated to cool the battery module 30.

In the instant case, the valve V1 connects the second coolant line 21 and the battery coolant line 31 so that the coolant cooled by the second radiator 22 is supplied to the battery module 30.

At the same time, the second branch line 80 is closed through the operation of the valve V1. Furthermore, the third branch line 90 is closed. Accordingly, the second coolant line 21 and the battery coolant line 31 are connected by the closed second and third branch lines 80 and 90.

That is, the second coolant line 21 and the battery coolant line 31 are connected to each other by a selective operation of the valve V1, and may form one closed circuit in which the coolant is circulated.

As a result, the coolant cooled by the second radiator 22 may be circulated along the second coolant line 21 and the battery coolant line 31 through the operations of the second water pump 26 and the third water pump 33.

That is, the cooled coolant discharged from the second radiator 22 flows into the battery module 30 through the battery coolant line 31 and cools the battery module 30.

The coolant that cools the battery module 30 passes through the heater 35 and the chiller 70 of which operation is turned off along the battery coolant line 31, and then flows into the second radiator again through the second coolant line 21.

That is, since a low-temperature coolant cooled by the second radiator 22 cools only the battery module 30, the battery module 30 may be efficiently cooled.

Meanwhile, the air-conditioning device 50 does not operate because the cooling mode of the vehicle does not operate.

When the electrical component 15, the motor 16, and the battery module 30 are cooled according to the cooling mode of the vehicle, the operation will be described with reference to FIG. 3.

Figure 3:
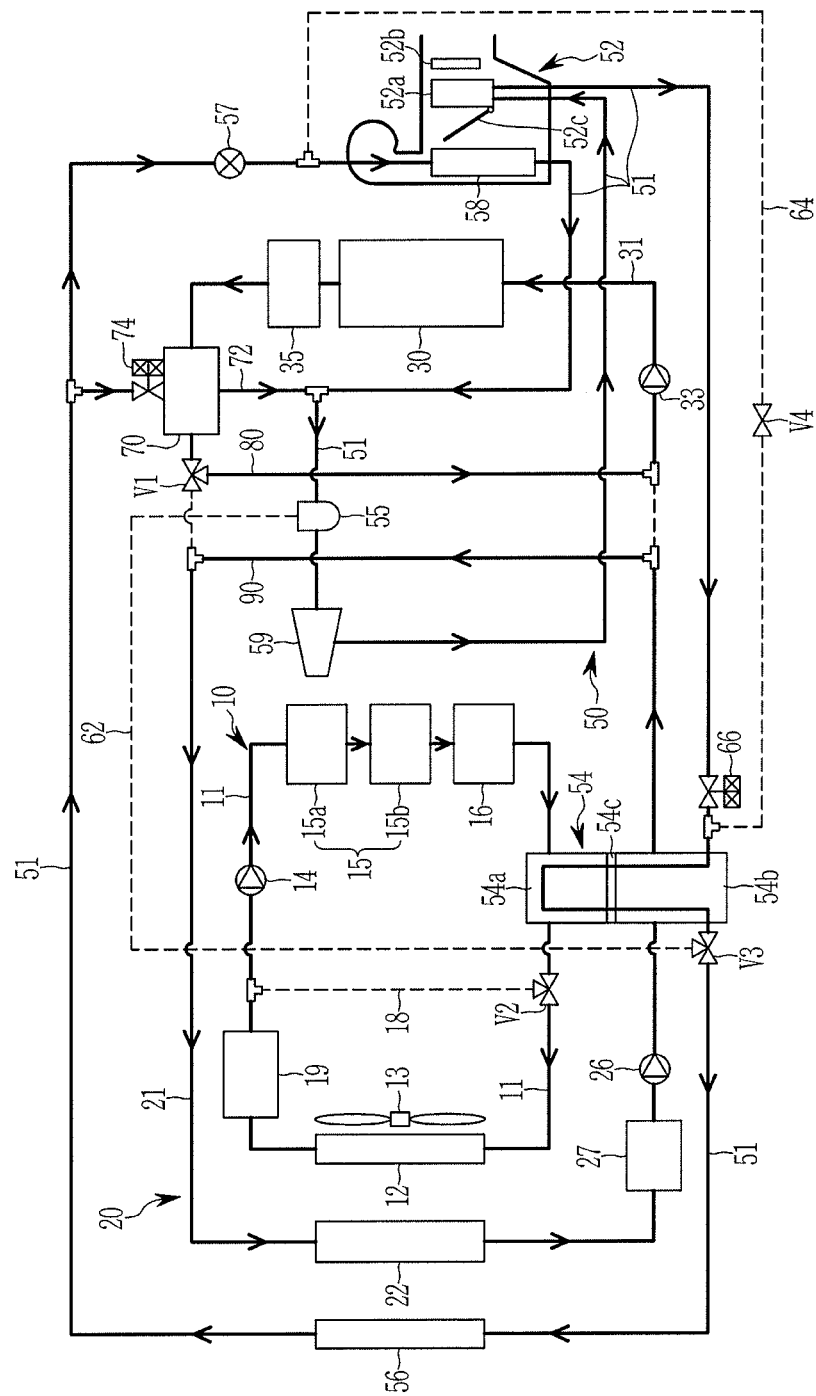
FIG. 3 is an operation state view exemplarily illustrating cooling of an electrical component and a battery module depending on a cooling mode in the heat pump system for a vehicle according to an exemplary embodiment of the present invention.

FIG. 3 is an operation state view exemplarily illustrating cooling of an electrical component and a battery module depending on a cooling mode in the heat pump system for a vehicle according to an exemplary embodiment of the present invention.

Referring to FIG. 3, in the first cooling device 10, the first water pump 14 is operated to cool the electrical component 15, the motor 16, and the main heat exchanger 54. Accordingly, the coolant cooled by the first radiator 12 is circulated in the electrical component 15, the motor 16, and the main heat exchanger 54.

Here, the second valve V2 may close the first branch line 18.

That is, in the first cooling device 10, the coolant cooled by the first radiator 12 may be supplied to the main heat exchanger 54 through the operation of the first water pump 14.

In the second cooling device 20, the second water pump 26 is operated to supply the coolant to the main heat exchanger 54.

Meanwhile, the second branch line 80 is opened through the operation of the first valve V1. Furthermore, the third branch line 90 is opened.

Accordingly, connection of the second coolant line 21 with the battery coolant line 31 is closed through the opened second and third branch lines 80 and 90 and the first valve V1.

That is, in the second cooling device 20, the opened third branch line 90 is connected to the second coolant line 21 to independently form a closed circuit in which the coolant is circulated.

Furthermore, the battery coolant line 31 may form a closed circuit in which the coolant is circulated independently through the opened second branch line 80.

Accordingly, the coolant cooled by the second radiator 22 is circulated along the second coolant line 21 and the third branch line 90 to cool the main heat exchanger 54 through the operation of the second water pump 26.

Components of the air-conditioning device 50 are operated to cool the interior of the vehicle, and the refrigerant is thus circulated along the refrigerant line 51.

Here, the first and second bypass lines 62 and 64 are closed through the operations of the third and fourth valves V3 and V4.

As a result, the main heat exchanger 54 condenses the refrigerant by use of the coolant which flows along the first and second coolant lines 11 and 21.

That is, the coolant supplied to the main heat exchanger 54 through the first coolant line 11 primarily condenses the refrigerant passing through the first heat dissipation unit 54a of the main heat exchanger 54. The coolant supplied to the main heat exchanger 54 through the second coolant line 21 may secondarily condense the refrigerant passing through the second heat dissipation unit 54b of the main heat exchanger 54.

As a result, the main heat exchanger 54 may increase the condensation amount of the refrigerant.

The refrigerant passing through the main heat exchanger 54 is flowed in the sub-condenser 56 according to the refrigerant line 51 opened through the operation of the third valve V3. The refrigerant flowed in the sub-condenser 56 may be condensed through heat exchange with the outside air.

Meanwhile, the coolant passing through the chiller 70 is circulated along the battery coolant line 31 and the second branch line 80 to cool the battery module 30 through the operation of the third water pump 33.

The coolant circulated along the battery coolant line 31 is cooled through heat exchange with the refrigerant supplied to the chiller 70. The coolant cooled by the chiller 70 is supplied to the battery module 30. As a result, the battery module 30 is cooled by the cooled coolant.

Here, the second expansion valve 74 expands some refrigerants among refrigerants passing through the sub-condenser 56, and opens the refrigerant connection line 72 to supply the expanded refrigerant to the chiller 70.

Furthermore, the third expansion valve 66 may make the refrigerant flow into the main heat exchanger 54 without expanding the refrigerant.

Therefore, some refrigerants discharged from the sub-condenser 56 are expanded through the operation of the second expansion valve 74 to enter a low-temperature state and flow into the chiller 70 connected to the refrigerant connection line 72.

After that, the refrigerant flowed into the chiller 70 undergoes heat transfer with the coolant, and is flowed into the compressor 59 through the refrigerant connection line 72.

The coolant of which temperature is raised while cooling the battery module 30 is cooled through heat exchange with a low-temperature and low-pressure refrigerant inside the chiller 70. The cooled coolant is supplied to the battery module 30 again through the battery coolant line 31.

That is, the coolant may efficiently cool the battery module 30 while repeatedly performing the operations described above.

Meanwhile, the remaining refrigerant discharged from the sub-condenser 56 flows through the refrigerant line 51 to cool the interior of the vehicle, and passes through the first expansion valve 57, the evaporator 58, the accumulator 55, the compressor 59, the internal condenser 52a, the main heat exchanger 54, and the sub-condenser 56 in sequence.

Here, the outside air flowing into the HVAC module 52 is cooled while passing through the evaporator 58 by the low-temperature refrigerant which flows into the evaporator 58.

In the instant case, the opening/closing door 52c closes a portion where the cooled outside air passes through the internal condenser 52a to prevent the cooled outside air from passing through the internal condenser 52a and the internal heater 52b. Therefore, the cooled outside air flows directly to the inside of the vehicle, cooling the interior of the vehicle.

Meanwhile, a refrigerant having an increased condensation amount while sequentially passing through the main heat exchanger 54 and the sub-condenser 56 is expanded and supplied to the evaporator 58, so that the refrigerant may be evaporated at a lower temperature.

That is, in the exemplary embodiment of the present invention, the first and second heat dissipation units 54a and 54b of the main heat exchanger 54 primarily and secondarily condense the refrigerant and the sub-condenser 56 additionally condenses the refrigerant, and as a result, sub-cooling of the refrigerant becomes advantageous.

Furthermore, as the refrigerant of which sub-cooling is performed is evaporated in the evaporator 58 at a lower temperature, and the temperature of the coolant which exchanges heat in the evaporator 58 may be further lowered, enhancing cooling performance and efficiency.

That is, the refrigerant cools the coolant through heat exchange while passing through the chiller 70 while cooling the internal in the cooling mode of the vehicle while repeatedly performing the aforementioned process.

The coolant cooled by the chiller 70 flows along the battery coolant line 31 connected through the operation of the first valve V1, and flows into the battery module 30. As a result, the battery module 30 may be efficiently cooled by the low-temperature coolant supplied to the battery coolant line 31.

In the exemplary embodiment of the present invention, for when the outside air heat is recovered in the heating mode of the vehicle, the operation will be described with reference to FIG. 4.

Figure 4:
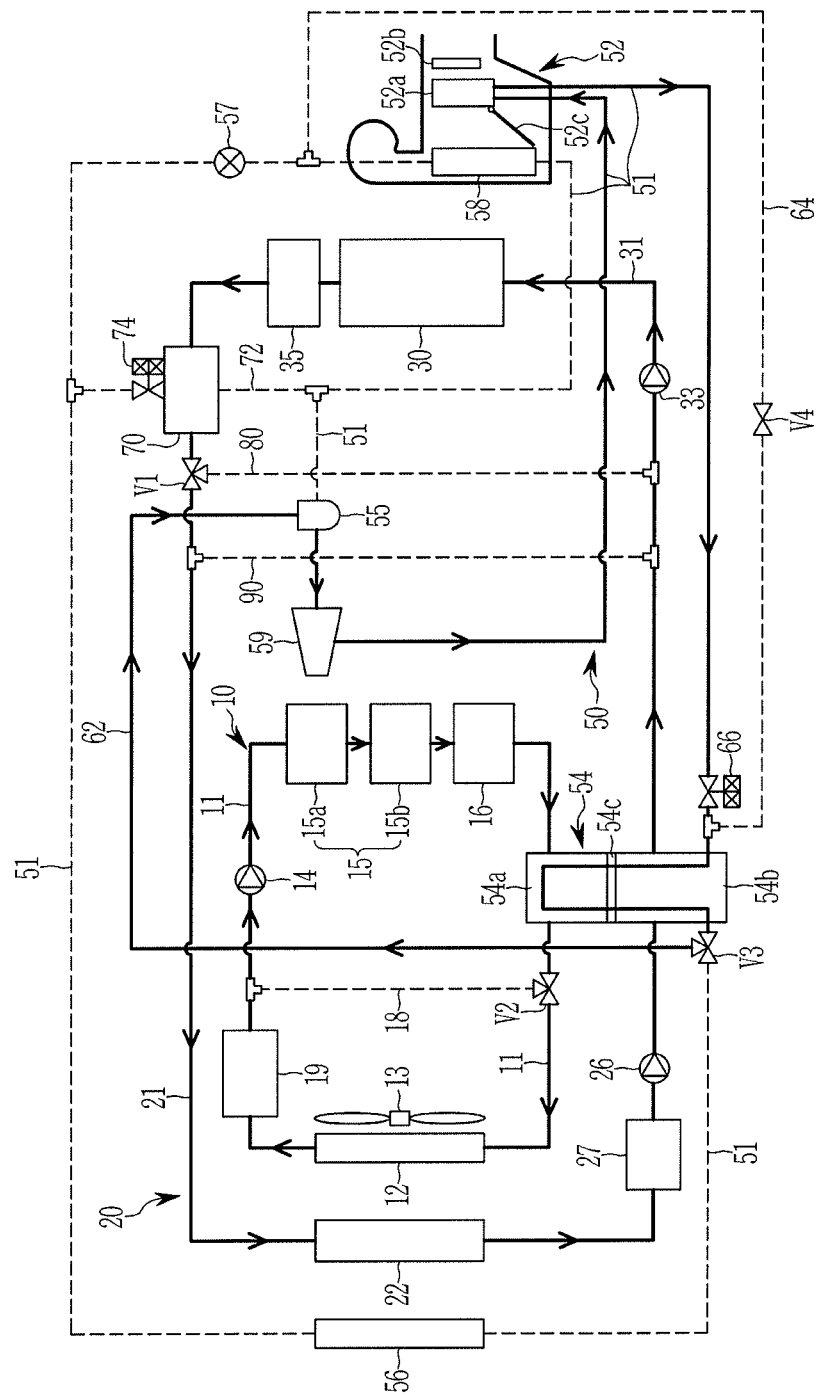
FIG. 4 is an operation state view exemplarily illustrating recovery of outside air heat depending on a heating mode in the heat pump system for a vehicle according to an exemplary embodiment of the present invention.

FIG. 4 is an operation state view exemplarily illustrating recovery of outside air heat depending on a heating mode in the heat pump system for a vehicle according to an exemplary embodiment of the present invention.

Referring to FIG. 4, the heat pump system may absorb the outside air heat in an initial start idle state of the vehicle, in which the waste heat of the electrical component 15, the motor 16, and the battery module 30 is insufficient.

First, in the first cooling device 10, the first water pump 14 is operated. Here, the second valve V2 closes the first branch line 18.

That is, in the first cooling device 10, the coolant passing through the first radiator 12 may be supplied to the electrical component 15, the motor 16, and the main heat exchanger 54 through the operation of the first water pump 14.

In the second cooling device 20, the second water pump 26 is operated to supply the coolant to the main heat exchanger 54.

In the instant case, the first valve V1 connects the second coolant line 21 and the battery coolant line 31 so that the coolant passing through the second radiator 22 is supplied to the battery module 30.

At the same time, the second branch line 80 is closed through the operation of the valve V1. Furthermore, the third branch line 90 is closed. Accordingly, the second coolant line 21 and the battery coolant line 31 are connected by the closed second and third branch lines 80 and 90.

That is, the second coolant line 21 and the battery coolant line 31 are connected to each other by selective operation of the first valve V1, and may form one closed circuit in which the coolant is circulated.

As such, the coolant passing through the second radiator 22 may be circulated along the second coolant line 21 and the battery coolant line 31 through the operations of the second water pump 26 and the third water pump 33.

Accordingly, the coolants passing through the first and second coolant lines 11 and 21 respectively absorb the outside air heat while passing through the first and second radiators 12 and 22, and as a result, the temperatures of the coolants are raised. The coolants having the raised temperature are supplied to the main heat exchanger 54.

Meanwhile, components of the air-conditioning device 50 are operated to heat the interior of the vehicle and the refrigerant is thus circulated along the refrigerant line 51.

Here, the refrigerant line 51 connecting the main heat exchanger 54 and the evaporator 58 and the refrigerant connection line 72 connected to the chiller 70 are closed by operations of the first and second expansion valves 57 and 74.

Furthermore, the first bypass line 62 is opened through the operation of the third valve V3, and the second bypass line 64 is closed through the operation of the fourth valve V4.

Here, the third valve V3 closes the refrigerant line 51 connects the main heat exchanger 54 and sub-condenser 56.

Furthermore, the third expansion valve 66 may make the refrigerant flow into the main heat exchanger 54 without expanding the refrigerant.

As a result, the main heat exchanger 54 condenses the refrigerant by use of the coolant which flows along each of the first and second coolant lines 11 and 21 and has the raised temperature due to the recovered outside air heat.

That is, the coolant supplied to the main heat exchanger 54 through the first coolant line 11 primarily condenses the refrigerant passing through the first heat dissipation unit 54a of the main heat exchanger 54. The coolant supplied to the condenser 54 through the second coolant line 21 secondarily condenses the refrigerant passing through the second heat dissipation unit 54b of the main heat exchanger 54.

As a result, the main heat exchanger 54 may increase the evaporation amount of the refrigerant.

As such, the refrigerant passing through the main heat exchanger 54 is supplied to the accumulator 55 according to the opened first bypass line 62.

The refrigerant supplied to the accumulator 55 is separated into gas and liquid. Among the refrigerants separated into the gas and the liquid, the gaseous refrigerant is supplied to the compressor 59.

A refrigerant which is compressed in a high-temperature high-pressure state from the compressor 59 flows into the internal condenser 52a.

Here, the opening/closing door 52c is opened so that the outside air which flows into the HVAC module 52 and passes through the evaporator 58 passes through the internal condenser 52a.

As a result, the outside air which flows from the outside flows in a room temperature state in which the outside air is not cooled when passing through the evaporator 58 to which the refrigerant is not supplied. The flowing outside air is changed to a high-temperature state while passing through the internal condenser 52a and flows into the interior of the vehicle by passing through the internal heater 52b which is selectively operated, and as a result, heating of the interior of the vehicle may be implemented.

That is, when heating is required in the initial start idle state of the vehicle, the heat pump system according to the exemplary embodiment absorbs the outside air heat and utilizes the absorbed outside air heat for raising the temperature of the refrigerant to reduce the power consumption of the compressor 59 and enhance heating efficiency.

In the exemplary embodiment of the present invention, an operation for a case where the outside air heat and the waste heat of the electrical component 15 and the motor 16 is recovered in the heating mode of the vehicle will be described with reference to FIG. 5.

Figure 5:
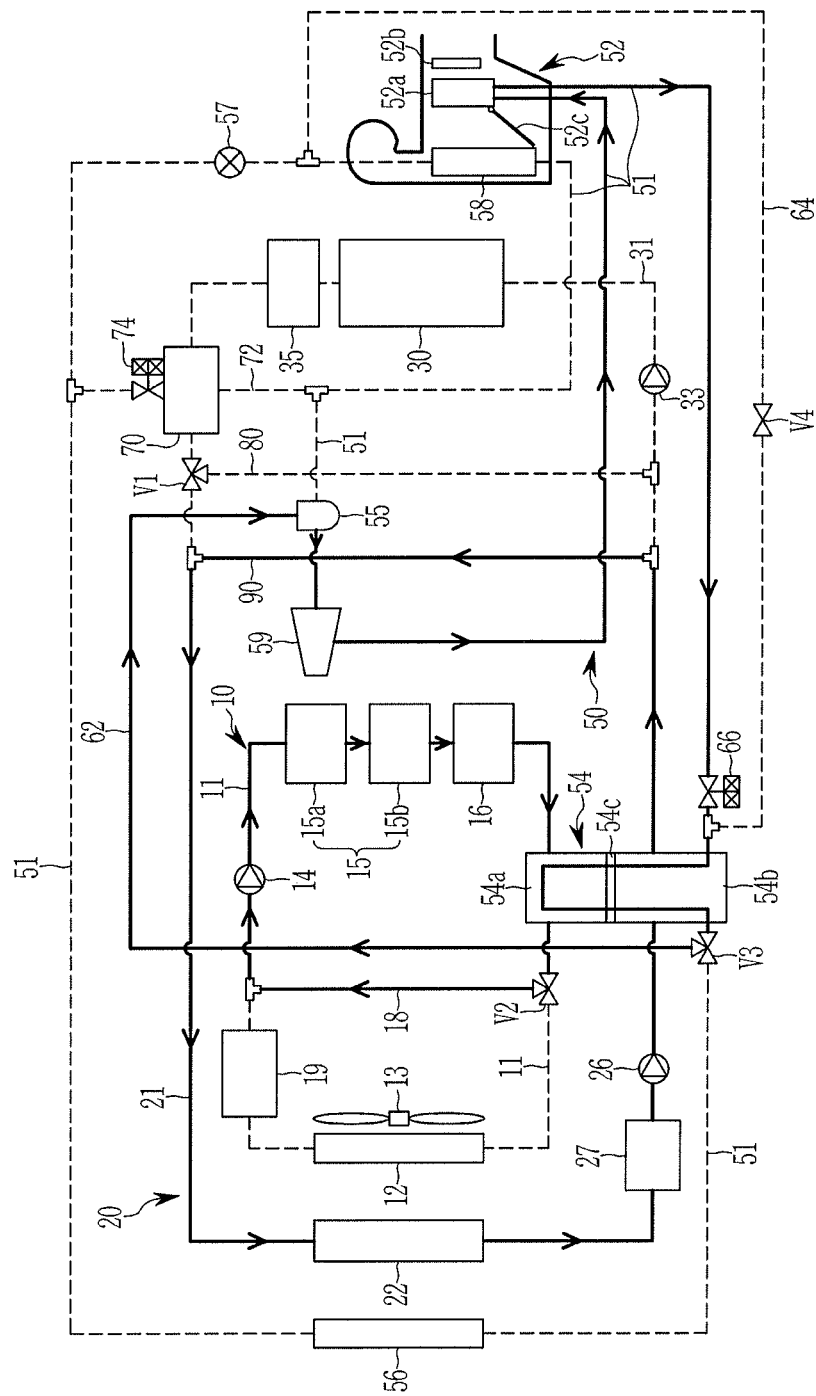
FIG. 5 is an operation state view exemplarily illustrating recovery of heat of the outside air and waste heat of a motor and an electrical component depending on the heating mode in the heat pump system for a vehicle according to an exemplary embodiment of the present invention.

FIG. 5 is an operation state view exemplarily illustrating recovery of heat of the outside air and waste heat of a motor and an electrical component depending on the heating mode in the heat pump system for a vehicle according to an exemplary embodiment of the present invention.

Referring to FIG. 5, the heat pump system may absorb the outside air heat in initial driving of the vehicle, in which the waste heat of the electrical component 15 and the motor 16 is insufficient.

First, the first cooling device 10 circulates the coolant to the electrical component 15 and the motor 16 11 by operating the first water pump 14. Here, the second valve V2 opens the first branch line 18 and closes the first coolant line 11 connecting the electrical component 15, the motor 16, and the first radiator 12.

As a result, the coolant passing through the electrical component 15 and the motor 16 is continuously circulated along the first coolant line 11 without passing through the first radiator 12 and absorbs the waste heat from the electrical component 15 and the motor 16, and thus has the raised temperature.

The coolant having the raised temperature may be supplied to the main heat exchanger 54.

That is, the waste heat generated from the electrical component 15 and the motor 16 raises the temperature of the coolant circulated in the first coolant line 11.

In the second cooling device 20, the second water pump 26 is operated to supply the coolant to the main heat exchanger 54.

Here, the second branch line 80 is closed through the operation of the first valve V1. At the same time, the third branch line 90 is opened.

Accordingly, connection of the second coolant line 21 with the battery coolant line 31 is closed through the closed second branch line 80 and the opened third branch line 90.

That is, in the second cooling device 20, the opened third branch line 90 is connected to the second coolant line 21 to form a closed circuit in which the coolant is independently circulated.

Meanwhile, the coolant is not circulated in the battery coolant line 31 by the third water pump 33 of which operation stops.

As a result, the coolant passing through the second radiator 22 may be circulated along the second coolant line 21 and the third branch line 90 through the operation of the second water pump 26.

Here, the coolant passing through each second coolant line 21 absorbs the outside air heat while passing through the second radiator 22, and thus has the raised temperature. The coolant having the raised temperature is supplied to the main heat exchanger 54.

That is, in the first and second cooling devices 10 and 20, the coolant having the raised temperature is recovered while raising the temperature of the refrigerant discharged from the main heat exchanger 54 while passing the main heat exchanger 54, through the operations of the first and second water pumps 14 and 26.

Meanwhile, components of the air-conditioning device 50 are operated to heat the interior of the vehicle and the refrigerant is thus circulated along the refrigerant line 51.

Here, the refrigerant line 51 connecting the main heat exchanger 54 and the evaporator 58 and the refrigerant connection line 72 connected to the chiller 70 are closed by the operations of the first and second expansion valves 57 and 74.

Furthermore, the first bypass line 62 is opened through the operation of the third valve V3, and the second bypass line 64 is closed through the operation of the fourth valve V4.

Here, the third valve V3 closes the refrigerant line 51 connects the main heat exchanger 54 and sub-condenser 56.

Furthermore, the third expansion valve 66 may make the refrigerant flow into the main heat exchanger 54 without expanding the refrigerant.

As a result, the main heat exchanger 54 evaporates the refrigerant by use of the coolant which flows along each of the first and second coolant lines 11 and 21 and has the raised temperature while recovering the waste heat of the electrical component 15 and the motor 16 and the outside air heat.

That is, the coolant supplied to the main heat exchanger 54 through the first coolant line 11 primarily condenses the refrigerant passing through the first heat dissipation unit 54a of the main heat exchanger 54. The coolant supplied to the condenser 54 through the second coolant line 21 secondarily condenses the refrigerant passing through the second heat dissipation unit 54b of the main heat exchanger 54.

As a result, the main heat exchanger 54 may increase the evaporation amount of the refrigerant.

As such, the refrigerant passing through the main heat exchanger 54 is supplied to the accumulator 55 according to the opened first bypass line 62.

The refrigerant supplied to the accumulator 55 is separated into gas and liquid. Among the refrigerants separated into the gas and the liquid, the gaseous refrigerant is supplied to the compressor 59.

A refrigerant which is compressed in a high-temperature high-pressure state from the compressor 59 flows into the internal condenser 52a.

Here, the opening/closing door 52c is opened so that the outside air which flows into the HVAC module 52 and passes through the evaporator 58 passes through the internal condenser 52a.

As a result, the outside air which flows from the outside flows in a room temperature state in which the outside air is not cooled when passing through the evaporator 58 to which the refrigerant is not supplied. The flowing outside air is changed to a high-temperature state while passing through the internal condenser 52a and flows into the interior of the vehicle by passing through the internal heater 52b which is selectively operated, and as a result, heating of the interior of the vehicle may be implemented.

That is, when heating is required during initial driving in which the waste heat of the electrical component 15 and the motor 16 is insufficient, the heat pump system according to the exemplary embodiment absorbs the outside air heat together with the waste heat of the electrical component 15 and the motor 16 and utilizes the absorbed outside air heat and waste heat for raising the temperature of the refrigerant to reduce the power consumption of the compressor 59 and enhance the heating efficiency.

In the exemplary embodiment of the present invention, an operation for a case where the waste heat of the electrical component 15 and the motor 16 is recovered in the heating mode of the vehicle will be described with reference to FIG. 6.

Figure 6:
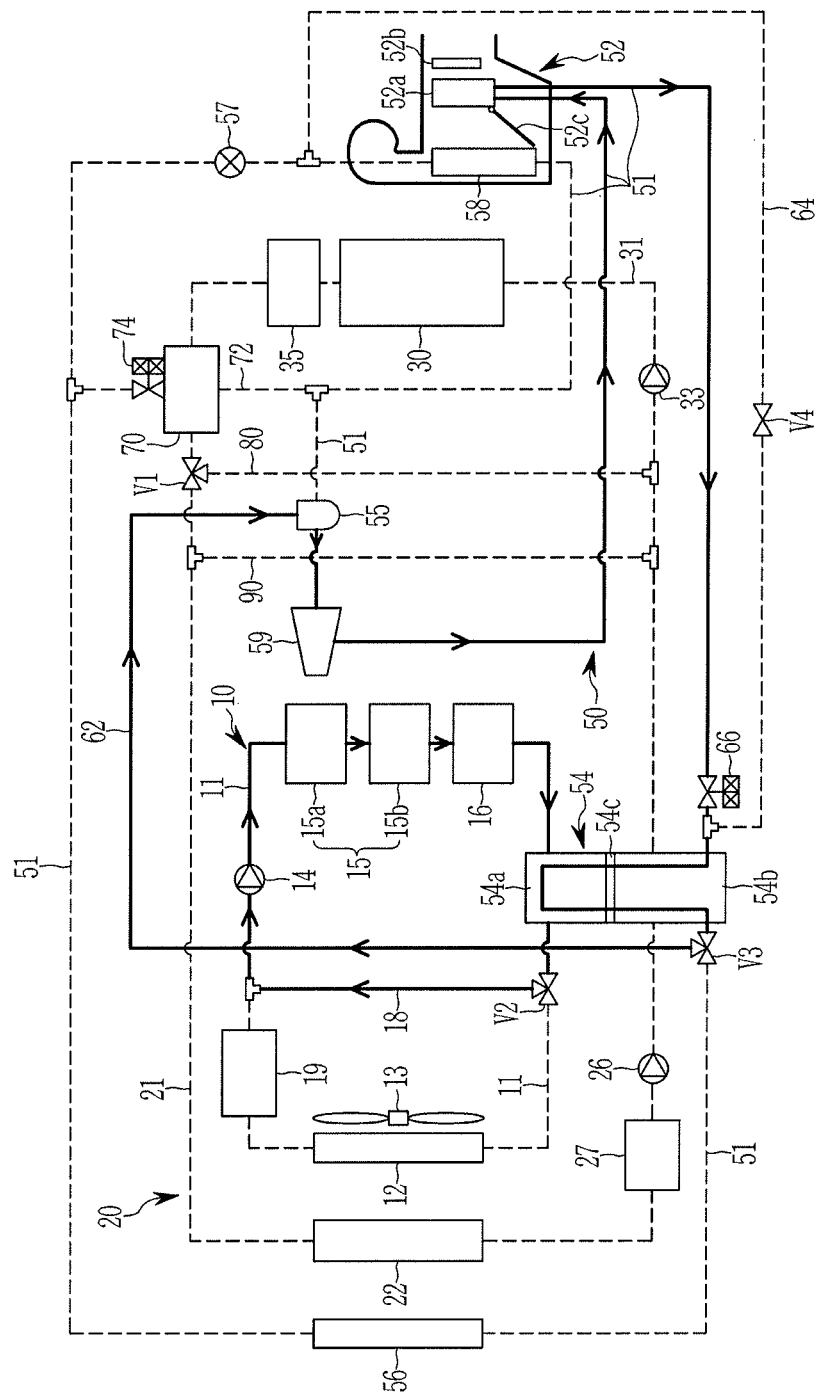
FIG. 6 is an operation state view exemplarily illustrating recovery of waste heat of the motor and the electrical component depending on the heating mode in the heat pump system for a vehicle according to an exemplary embodiment of the present invention.

FIG. 6 is an operation state view exemplarily illustrating recovery of waste heat of the motor and the electrical component depending on the heating mode in the heat pump system for a vehicle according to an exemplary embodiment of the present invention.

Referring to FIG. 6, when the waste heat of the electrical component 15 and the motor 16 is sufficient, the heat pump system may absorb the waste heat of the electrical component 15 and the motor 16 and use the recovered waste heat for heating the interior.

First, the first cooling device 10 circulates the coolant to the electrical component 15 and the motor 16 by operating the first water pump 14. Here, the second valve V2 opens the first branch line 18 and closes the first coolant line 11 connecting the electrical component 15, the motor 16, and the first radiator 12.

As a result, the coolant passing through the electrical component 15 and the motor 16 is continuously circulated along the first coolant line 11 without passing through the first radiator 12, and absorbs the waste heat from the electrical component 15 and the motor 16 and thus has the raised temperature.

The coolant having the raised temperature may be supplied to the main heat exchanger 54.

That is, the waste heat generated from the electrical component 15 and the motor 16 raises the temperature of the coolant circulated in the first coolant line 11.

In the second cooling device 20, as the operation of the second water pump 26 stops, circulation of the coolant stops. Furthermore, the coolant is not circulated in the battery coolant line 31 by the third water pump 33 of which operation stops.

That is, in the first cooling device 10, the coolant having the raised temperature is recovered while raising the temperature of the refrigerant discharged from the main heat exchanger 54 while passing the main heat exchanger 54 through the operation of the first water pump 14.

Meanwhile, components of the air-conditioning device 50 are operated to heat the interior of the vehicle, and the refrigerant is thus circulated along the refrigerant line 51.

Here, the refrigerant line 51 connecting the main heat exchanger 54 and the evaporator 58 and the refrigerant connection line 72 connected to the chiller 70 are closed by the operations of the first and second expansion valves 57 and 74.

Furthermore, the first bypass line 62 is opened through the operation of the third valve V3 and the second bypass line 64 is closed through the operation of the fourth valve V4.

Here, the third valve V3 closes the refrigerant line 51 connects the main heat exchanger 54 and sub-condenser 56.

Furthermore, the third expansion valve 66 may make the refrigerant flow into the main heat exchanger 54 without expanding the refrigerant.

As a result, the main heat exchanger 54 evaporates the refrigerant by use of the coolant which flows along the first coolant line 11 and has the raised temperature while recovering the waste heat of the electrical component 15 and the motor 16.

That is, the coolant supplied to the main heat exchanger 54 through the first coolant line 11 evaporates the refrigerant passing through the first heat dissipation unit 54a of the main heat exchanger 54.

Meanwhile, the second heat dissipation unit 54b does not secondarily evaporate the refrigerant as the supply of the coolant through the second coolant line 21 stops.

However, as the coolant which flows into the first dissipation unit 54a flows into the high-temperature state by sufficiently absorbing the waste heat from the motor 15 and the electrical component 16, the main heat exchanger 54 may increase the evaporation amount.

As such, the refrigerant passing through the main heat exchanger 54 is supplied to the accumulator 55 according to the opened first bypass line 62.

The refrigerant supplied to the accumulator 55 is separated into gas and liquid. Among the refrigerants separated into the gas and the liquid, the gaseous refrigerant is supplied to the compressor 59.

The refrigerant which is compressed in the high-temperature high-pressure state from the compressor 59 flows into the internal condenser 52a.

Here, the opening/closing door 52c is opened so that the outside air which flows into the HVAC module 52 and passes through the evaporator 58 passes through the internal condenser 52a.

As a result, the outside air which flows from the outside thereof flows into a room temperature state in which the outside air is not cooled when passing through the evaporator 58 to which the refrigerant is not supplied. The flowing outside air is changed to a high-temperature state while passing through the internal condenser 52a and flows into the interior of the vehicle by passing through the internal heater 52b which is selectively operated, and as a result, heating of the interior of the vehicle may be implemented.

That is, when heating is required in the state where the waste heat of the electrical component 15 and the motor 16 is insufficient, the heat pump system according to the exemplary embodiment absorbs the waste heat of the electrical component 15 and the motor 16 and utilizes the absorbed waste heat for raising the temperature of the refrigerant to reduce the power consumption of the compressor 59 and enhance the heating efficiency.

In the exemplary embodiment of the present invention, an operation for a case where the waste heat of the electrical component 15 and the battery module 30 is recovered in the heating mode while the battery module 30 is charged will be described with reference to FIG. 7.

Figure 7:
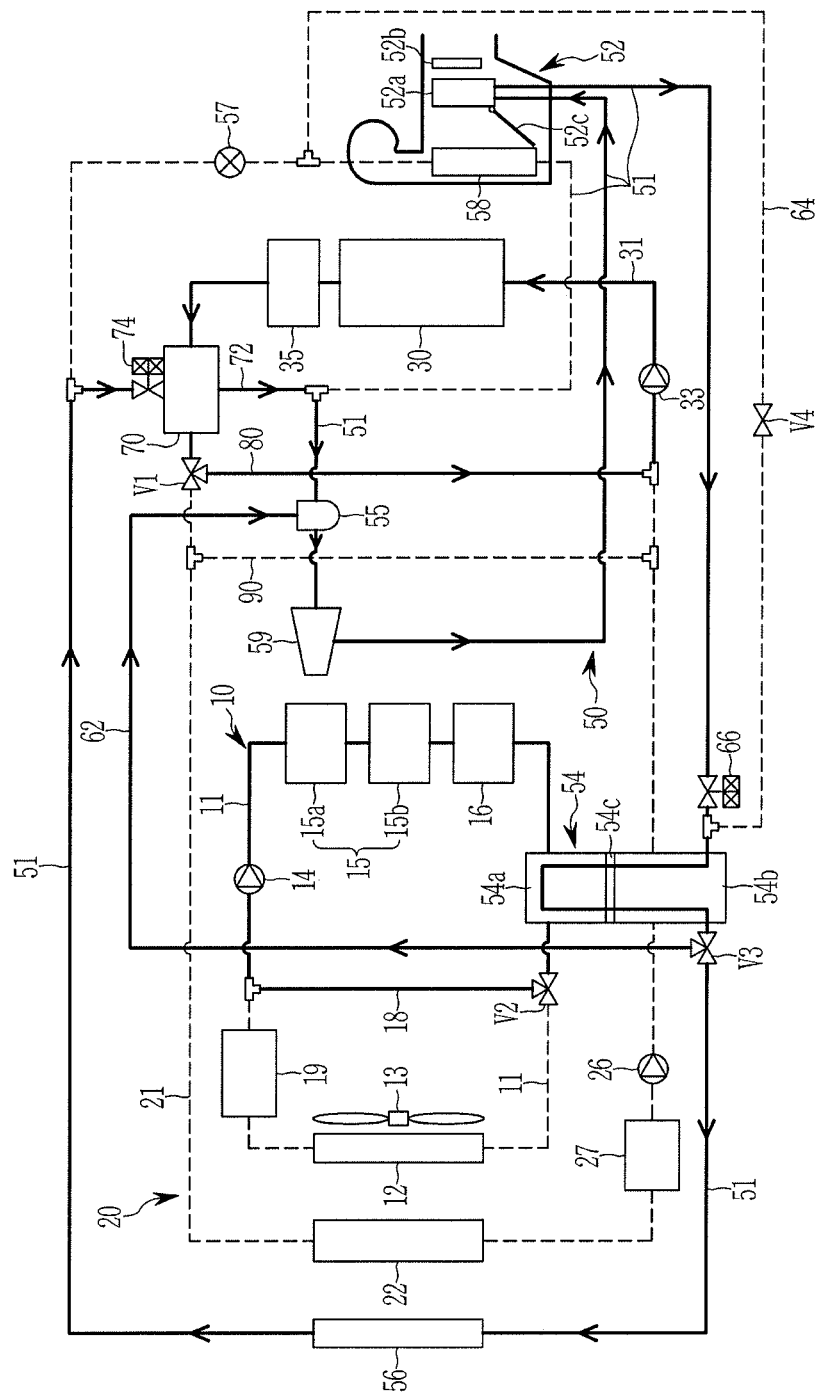
FIG. 7 is an operation state view exemplarily illustrating recovery of waste heat of a battery module at the time of charging the battery module depending on the heating mode in the heat pump system for a vehicle according to an exemplary embodiment of the present invention.

FIG. 7 is an operation state view exemplarily illustrating recovery of waste heat of a battery module at the time of charging the battery module depending on the heating mode in the heat pump system for a vehicle according to an exemplary embodiment of the present invention.

Referring to FIG. 7, the heat pump system may recover the waste heat of the on board charger 15b and the battery module 30 and use the recovered waste heat for heating the internal at the time of charging the vehicle.

First, the first cooling device 10 circulates the coolant to the electrical component 15 and the motor 16 by operating the first water pump 14. In the instant case, the on board charger 15b operates, and the inverter 15a and the motor 16 stop. As a result, the waste heat from the on board charger 15b may be absorbed.

Here, the second valve V2 opens the first branch line 18 and closes the first coolant line 11 connecting the electrical component 15, the motor 16, and the first radiator 12.

As a result, the coolant passing through the electrical component 15 and the motor 16 is continuously circulated along the first coolant line 11 without passing through the first radiator 12 and absorbs the waste heat from the on board charger 15b and thus has the raised temperature.

The coolant having the raised temperature may be supplied to the main heat exchanger 54.

That is, the waste heat generated from the on board charger 15b raises the temperature of the coolant circulated in the first coolant line 11.

In the second cooling device 20, as the operation of the second water pump 26 stops, circulation of the coolant stops.

The second branch line 80 is opened through the operation of the first valve V1 and the third branch line 90 is closed.

As a result, the battery coolant line 31 connected to the battery module 30 may form a closed circuit in which the coolant is circulated independently through the opened second branch line 80.

As such, the coolant may be circulated to the chiller 70 and the battery module 30 along the battery coolant line 31 and the second branch line 80 through the operation of the third water pump 33.

That is, in the first cooling device 10, the coolant having the raised temperature is recovered while raising the temperature of the refrigerant discharged from the main heat exchanger 54 while passing the main heat exchanger 54 through the operation of the first water pump 14.

Furthermore, the coolant circulated along the battery coolant line 31 and the second branch line 80 absorbs the waste heat generated from the battery module 30 and thus has the raised temperature during charging.

Meanwhile, components of the air-conditioning device 50 are operated to heat the interior of the vehicle and the refrigerant is thus circulated along the refrigerant line 51.

Here, the refrigerant line 51 connecting the main heat exchanger 54 and the evaporator 58 is closed as the operation of the first expansion valve 57 stops.

Furthermore, the refrigerant connection line 72 is opened through the operation of the second expansion valve 74.

Here, the second expansion valve 74 may expand the refrigerant and supply the expanded refrigerant to the chiller 70.

Furthermore, the first bypass line 62 is opened through the operation of the third valve V3 and the second bypass line 64 is closed through the operation of the fourth valve V4.

Here, the third valve V3 opens the refrigerant line 51 connects the main heat exchanger 54 and sub-condenser 56.

Furthermore, the third expansion valve 66 may make the refrigerant flow into the main heat exchanger 54 without expanding the refrigerant.

As a result, the main heat exchanger 54 evaporates the refrigerant by use of the coolant which flows along the first coolant line 11 and has the raised temperature while recovering the waste heat of the on board charger 15b.

That is, the coolant supplied to the main heat exchanger 54 through the first coolant line 11 evaporates the refrigerant passing through the first heat dissipation unit 54a of the main heat exchanger 54.

Meanwhile, the second heat dissipation unit 54b does not secondarily evaporate the refrigerant as the supply of the coolant through the second coolant line 21 stops.

As such, the refrigerant passing through the main heat exchanger 54 is supplied to the accumulator 55 according to the opened first bypass line 62.

The refrigerant supplied to the accumulator 55 is separated into gas and liquid. Among the refrigerants separated into the gas and the liquid, the gaseous refrigerant is supplied to the compressor 59.

At the same time, the third valve V3 may supply some refrigerants of the refrigerants discharged from the main heat exchanger 54 to the sub-condenser 56. Here, the since the vehicle stops or is parked for charging, the refrigerant supplied to the sub-condenser 56 may pass without heat exchange with the outside air.

The refrigerant passing through the sub-condenser 56 may be expanded while passing through the second expansion valve 76 and may flow into the chiller 70 through the refrigerant connection line 72.

That is, the third valve V3 may supply the refrigerant to the accumulator 55 through the opened first bypass line 62 such that the gaseous refrigerant in the refrigerant supplied to the accumulator 55 is supplied to the compressor 59.

Furthermore, the third valve V3 may open the refrigerant line 51 connected to the refrigerant connection line 72 so that the refrigerant is supplied to the chiller 70.

The refrigerant which flows into the chiller 70 is evaporated through heat exchange with the high-temperature coolant which flows into the chiller 70, and is then supplied to the compressor 59 via the accumulator 55.

That is, the refrigerant evaporated in the main heat exchanger 54 and the refrigerant evaporated in the chiller 70 may flow into the compressor 59.

As such, the refrigerant which is compressed in the high-temperature high-pressure state from the compressor 59 flows into the internal condenser 52a.

Here, the opening/closing door 52c is opened so that the outside air which flows into the HVAC module 52 and passes through the evaporator 58 passes through the internal condenser 52a.

As a result, the outside air which flows from the outside flows in a room temperature state in which the outside air is not cooled when passing through the evaporator 58 to which the refrigerant is not supplied. The flowing outside air is changed to the high-temperature state while passing through the internal condenser 52a and flows into the interior of the vehicle by passing through the internal heater 52b which is selectively operated, and as a result, heating the interior of the vehicle may be implemented.

That is, when heating is required at the time of charging the battery module 30, the heat pump system according to the exemplary embodiment absorbs the waste heat of the oncharger 15b and the battery module 30 and utilizes the absorbed waste heat for raising the temperature of the refrigerant to reduce the power consumption of the compressor 58 and enhance the heating efficiency.

In the exemplary embodiment of the present invention, an operation for a case where the waste heat of the electrical component 15 and the motor 16 is recovered depending on the heating and dehumidifying modes of the vehicle will be described with reference to FIG. 8.

Figure 8:
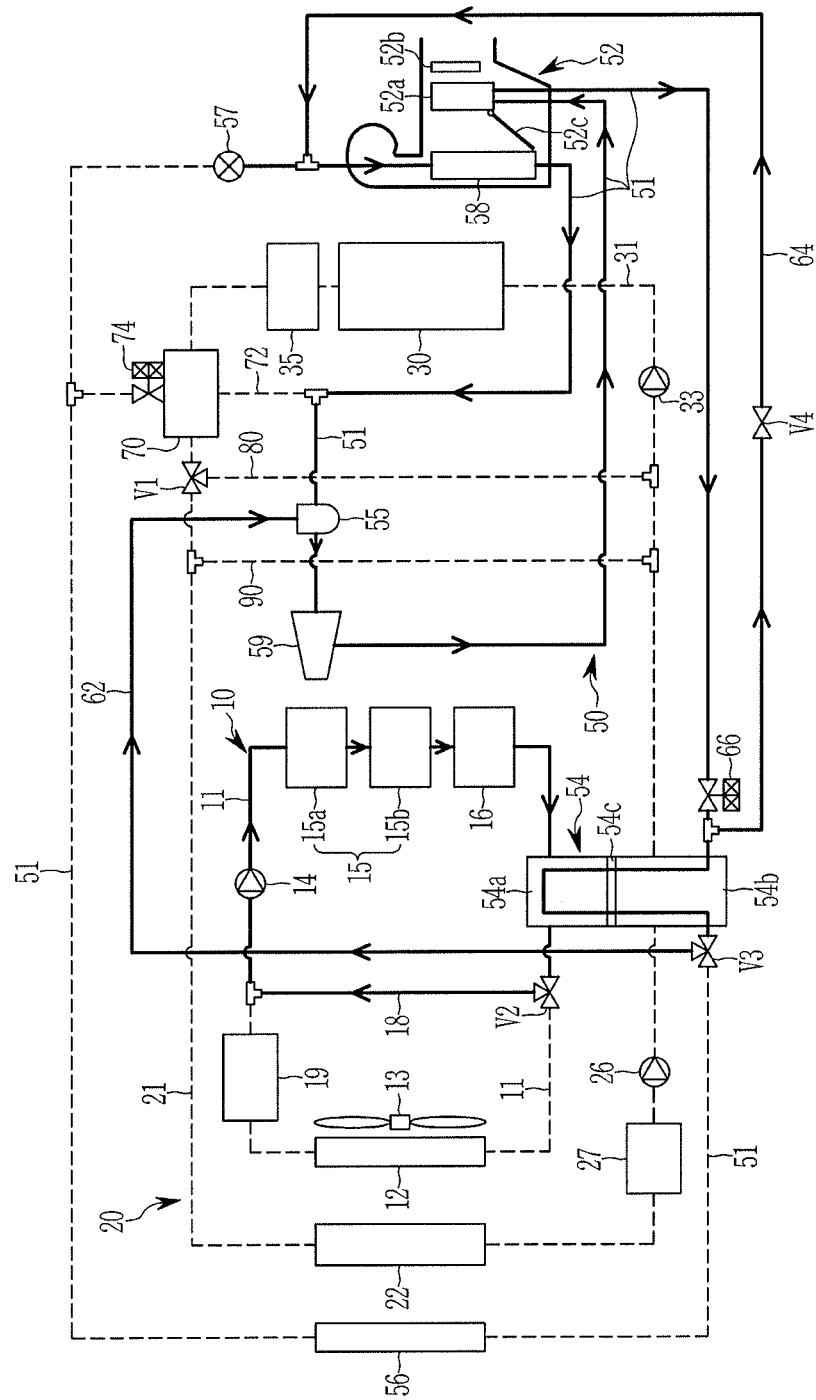
FIG. 8 is an operation state view depending on the heating mode and a dehumidifying mode in the heat pump system for a vehicle according to an exemplary embodiment of the present invention.

FIG. 8 is an operation state view depending on the heating mode and a dehumidifying mode in the heat pump system for a vehicle according to an exemplary embodiment of the present invention.

Referring to FIG. 8, the heat pump system may recover the waste heat of the electrical component 15 and the motor 16 and use the recovered waste heat for heating the internal in the heating and dehumidifying modes of the vehicle.

First, the first cooling device 10 circulates the coolant to the electrical component 15 and the motor 16 by operating the first water pump 14. Here, the second valve V2 opens the first branch line 18 and closes the first coolant line 11 connecting the electrical component 15, the motor 16, and the first radiator 12.

As a result, the coolant passing through the electrical component 15 and the motor 16 is continuously circulated along the first coolant line 11 without passing through the first radiator 12, and absorbs the waste heat from the electrical component 15 and the motor 16 and thus has the raised temperature.

The coolant having the raised temperature may be supplied to the main heat exchanger 54.

That is, the waste heat generated from the electrical component 15 and the motor 16 raises the temperature of the coolant circulated in the first coolant line 11.

In the second cooling device 20, as the operation of the second water pump 26 stops, circulation of the coolant stops.

Furthermore, the coolant is not circulated in the battery coolant line 31 by the third water pump 33 of which operation stops.

That is, in the first cooling device 10, the coolant having the raised temperature is recovered while raising the temperature of the refrigerant discharged from the main heat exchanger 54 while passing the main heat exchanger 54 through the operation of the first water pump 14.

Meanwhile, components of the air-conditioning device 50 are operated to heat the interior of the vehicle and the refrigerant is thus circulated along the refrigerant line 51.

Here, the refrigerant line 51 connecting the main heat exchanger 54 and the evaporator 58 and the refrigerant connection line 72 connected to the chiller 70 are closed by the operations of the first and second expansion valves 57 and 74.

Furthermore, the first bypass line 62 is opened through the operation of the third valve V3 and the second bypass line 64 is opened through the operation of the fourth valve V4.

Here, the third valve V3 closes the refrigerant line 51 connects the main heat exchanger 54 and sub-condenser 56.

Furthermore, the third expansion valve 66 may expand the refrigerant and supply the expanded refrigerant to each of the main heat exchanger 54 and the evaporator 58 through the opened second bypass line 64.

As a result, the main heat exchanger 54 evaporates the refrigerant by use of the coolant which flows along the first coolant line 11 and has the raised temperature while recovering the waste heat of the electrical component 15 and the motor 16.

That is, the coolant supplied to the main heat exchanger 54 through the first coolant line 11 evaporates the refrigerant passing through the first heat dissipation unit 54a of the main heat exchanger 54.

Meanwhile, the second heat dissipation unit 54b does not secondarily evaporate the refrigerant as the supply of the coolant through the second coolant line 21 stops.

However, as the coolant which flows into the first dissipation unit 54a flows in the high-temperature state by sufficiently absorbing the waste heat from the motor 15 and the electrical component 16, the main heat exchanger 54 may increase the evaporation amount.

As such, the refrigerant passing through the main heat exchanger 54 is supplied to the accumulator 55 according to the opened first bypass line 62.

The refrigerant supplied to the accumulator 55 is separated into gas and liquid. Among the refrigerants separated into the gas and the liquid, the gaseous refrigerant is supplied to the compressor 59.

Meanwhile, the expanded refrigerant supplied to the evaporator 58 through the second bypass line 64 heat-exchanges with the outside air passing through the evaporator 58, and then is supplied to the compressor 59 via the accumulator 55 along the refrigerant line 51.

That is, the refrigerant passing through the evaporator 58 may be supplied to the compressor 59 together with the refrigerant flowed into the accumulator 55 through the first bypass line 64.

Furthermore, the refrigerant which is compressed in the high-temperature high-pressure state from the compressor 59 flows into the internal condenser 52a.

Here, the opening/closing door 52c is opened so that the outside air which flows into the HVAC module 52 and passes through the evaporator 58 passes through the internal condenser 52a.

That is, the outside air flowing into the HVAC module 52 is dehumidified while passing through the evaporator 58 by the low-temperature refrigerant which flows into the evaporator 58. As such, the flowing outside air is changed to the high-temperature state while passing through the internal condenser 52a and flows into the interior of the vehicle by passing through the internal heater 52b which is selectively operated, and as a result, the interior of the vehicle is heated and dehumidified.

That is, the heat pump system according to the exemplary embodiment utilizes the waste heat generated from the electrical component 15 and the motor 16 for raising the temperature of the refrigerant in the heating and dehumidify mode of the vehicle to reduce the power consumption of the compressor 59 and enhance the heating efficiency.

Furthermore, of the refrigerant expanded through the operation of the third expansion valve 66, some refrigerant flow into the evaporator 58 through the second bypass line 64 to dehumidify the internal without operating the first expansion valve 57.

Accordingly, as described above, when the heat pump system according to the exemplary embodiment of the present invention is applied, the battery module 30 is heated or cooled according to the modes of the vehicle by use of one chiller 70 in which the coolant and the refrigerant exchange heat in the electric vehicle, facilitating simplification of the system.

Furthermore, according to an exemplary embodiment of the present invention, the battery module is efficiently heated or cooled, facilitating optimal performance of the battery module 30 and increasing the overall driving distance of the vehicle through efficient management of the battery module 30.

Furthermore, according to an exemplary embodiment of the present invention, the heat of the outside air, and the waste heat of the electrical component 15, the motor 16, and the battery module 30, are selectively used in the heating mode of the vehicle, enhancing the heating efficiency.

In an exemplary embodiment of the present invention, a controller is connected to at least one of the elements of the heat pump system, to control the operations thereof.

The controller may be at least one microprocessor operated by a predetermined program which may include a series of commands for carrying out a method in accordance with various exemplary embodiments of the present invention.

Furthermore, according to an exemplary embodiment of the present invention, condensation or evaporation performance of the refrigerant is increased through the main heat exchanger 54 that dually condenses or evaporates the refrigerant by use of the coolant supplied from each of first and second cooling devices 10 and 20, enhancing the cooling performance and reducing power consumption of the compressor 59.

Furthermore, according to an exemplary embodiment of the present invention, manufacturing cost may be reduced, weight may be reduced, and spatial utilization may be enhanced through simplification of an entire system.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A heat pump system for a vehicle, the heat pump system comprising:
   a first cooling device including a first radiator and a first water pump connected through a first coolant line and configured of circulating a coolant in the first coolant line to cool at least one electrical component and at least one motor mounted on the first coolant line;
   a second cooling device including a second radiator and a second water pump connected through a second coolant line and configured of circulating the coolant in the second coolant line;
   a battery module mounted on a battery coolant line selectively connectable to the second coolant line through a first valve mounted on the battery coolant line; and
   a chiller mounted on the battery coolant line and through which the coolant passes, connected to a refrigerant line of an air-conditioning device through a refrigerant connection line, and configured of making the coolant which selectively flows exchange heat with a refrigerant supplied from the air-conditioning device to control a temperature of the coolant,
   wherein a heat exchanger mounted in the air-conditioning device is connected to each of the first and second coolant lines so that the coolant circulated in the first and second cooling devices passes through the first and second cooling devices, respectively,
   wherein the refrigerant passing through the heat exchanger exchanges heat with the coolant supplied through the first coolant line and exchanges heat with the coolant supplied through the second coolant line, and
   wherein the refrigerant discharged from the heat exchanger is selectively supplied to an accumulator mounted on the refrigerant line, or the chiller, or an evaporator mounted in the air-conditioning device through a third valve that operates according to modes of the vehicle.

2. The heat pump system of claim 1,
   wherein the modes of the vehicle include cooling, heating, and dehumidifying modes, and
   wherein the air-conditioning device includes:
   a HVAC module connected to the refrigerant line and having a door configured for controlling outside air passing through the evaporator to selectively flow into a first condenser according to the cooling, heating, and dehumidifying modes of the vehicle;
   a compressor connected to the refrigerant line between the evaporator and the first condenser;
   a first expansion valve mounted on the refrigerant line connecting the heat exchanger and the evaporator;
   a second expansion valve mounted on the refrigerant connection line;

a first bypass line connecting the heat exchanger and the accumulator through the third valve so that the refrigerant passing through the heat exchanger passes through the accumulator and selectively flows into the compressor through the refrigerant line;

a third expansion valve mounted on the refrigerant line between the first condenser and the heat exchanger; and a second bypass line connecting the refrigerant line between the heat exchanger and the third expansion valve and the refrigerant line between the first expansion valve and the evaporator so that the refrigerant passing through the first condenser selectively flows into the evaporator.

3. The heat pump system of claim 2, wherein a second condenser is mounted on the refrigerant line between the heat exchanger and the evaporator.

4. The heat pump system of claim 3, wherein the second condenser additionally condenses the refrigerant condensed by the heat exchanger through heat exchange with the outside air when the heat exchanger condenses the refrigerant.

5. The heat pump system of claim 2, wherein the second expansion valve is operated when the battery module is cooled by the refrigerant, and expands the refrigerant which flows through the refrigerant connection line and makes the expanded refrigerant to flow into the chiller.

6. The heat pump system of claim 2, wherein the third expansion valve selectively expands the refrigerant which flows into the heat exchanger and the second bypass line in the heating and dehumidifying modes of the vehicle.

7. The heat pump system of claim 2,
wherein the first valve is configured to selectively connect the second coolant line and the battery coolant line between the second radiator and the chiller,
wherein a first branch line connected to the first coolant line between the first radiator and the first water pump through a second valve mounted on the first coolant line between the first radiator and the first water pump is mounted in the first cooling device,
wherein a second branch line connecting the chiller and the battery module through the first valve is mounted on the battery coolant line,
wherein a third branch line separating the battery coolant line and the second coolant line is mounted on the second coolant line, and
wherein a fourth valve is mounted on the second bypass line.

8. The heat pump system of claim 7, wherein when the battery module is cooled by use of the coolant cooled by the second radiator, the first valve is configured to connect the second coolant line and the battery coolant line and to close the second branch line, and the second valve is configured to close the first branch line.

9. The heat pump system of claim 7, wherein when the battery module is cooled in the cooling mode of the vehicle,
the first branch line is closed through operation of the second valve and the coolant cooled by the first radiator is circulated to the at least one electrical component and the at least one motor through operation of the first water pump,
the second branch line is opened through operation of the first valve, the third branch line is opened, and connection between the second coolant line and the battery coolant line is closed by the opened second and third branch lines, and
the refrigerant is circulated along the refrigerant line while the first and second bypass lines are closed through operations of the third and fourth valves and the second expansion valve is operated so that the expanded refrigerant flows into the chiller through the refrigerant connection line, and
the third expansion valve makes the refrigerant pass to the heat exchanger.

10. The heat pump system of claim 9, wherein
the coolant cooled by the first radiator is supplied to the heat exchanger through operation of the first water pump,
the opened third branch line is connected to the second coolant line to form an independent closed circuit and the coolant cooled by the second radiator is supplied to the heat exchanger through operation of the second water pump, and
the heat exchanger condenses the refrigerant through heat exchange with the coolant.

11. The heat pump system of claim 7, wherein when outside air heat is recovered in the heating mode of the vehicle,
the coolant is circulated to the second coolant line through operation of the second water pump,
the second branch line is closed through operation of the first valve, the third branch line is closed, and the second coolant line and the battery coolant line are connected by the closed second and third branch lines,
the coolant passing through the second radiator is supplied to the heat exchanger through operation of the second water pump,
the refrigerant line connecting the heat exchanger and the evaporator and the refrigerant connection line are closed through operations of the first and second expansion valves,
the refrigerant line connected to the evaporator is closed through operation of the third valve, and the first bypass line is opened through operation of the third valve,
the second bypass line is closed through operation of the fourth valve, and
the third expansion valve is configured to expand the refrigerant passing through the first condenser and supplies the expanded refrigerant to the heat exchanger.

12. The heat pump system of claim 7, wherein when heat of the outside air and waste heat of the at least one electrical component and the at least one motor are recovered in the heating mode of the vehicle,
the coolant is circulated to the at least one electrical component through operation of the first water pump,
while the first branch line is opened through operation of the second valve, the first coolant line connecting the at least one electrical component, the at least one motor, and the first radiator is closed, and
the coolant is circulated to the second coolant line through operation of the second water pump,
the second branch line is closed through operation of the first valve, the third branch line is opened, and connection between the second coolant line and the battery coolant line is closed by the opened third branch line,
while the refrigerant line connecting the heat exchanger and the evaporator and the refrigerant connection line are closed through operations of the first and second expansion valves,
the first bypass line is opened through operation of the third valve,
the second bypass line is closed through operation of the fourth valve, and the third expansion valve is configured to expand the refrigerant and supplies the expanded refrigerant to the heat exchanger.

13. The heat pump system of claim 7, wherein when waste heat of the at least one electrical component and the at least one motor is recovered in the heating mode of the vehicle,
the coolant is circulated to the at least one electrical component through operation of the first water pump,
while the first branch line is opened through operation of the second valve,
the first coolant line connecting the at least one electrical component, the at least one motor, and the first radiator is closed, and
operation of the second water pump stops,
operation of the third water pump stops, and
the second branch line is closed through operation of the first valve and the third branch line is closed,
while the refrigerant line connecting the heat exchanger and the evaporator is closed through operation of the first expansion valve,
the first bypass line is opened through operation of the third valve,
the second bypass line is closed through operation of the fourth valve, and
the third expansion valve is configured to expand the refrigerant and supplies the expanded refrigerant to the heat exchanger.

14. The heat pump system of claim 7, wherein when waste heat of the battery module is recovered during charging in the heating mode of the vehicle,
the coolant is circulated to the at least one electrical component through operation of the first water pump,
while the first branch line is opened through operation of the second valve,
the first coolant line connecting the at least one electrical component, the at least motor, and the first radiator is closed,
operation of the second water pump stops,
the second branch line is opened through operation of the first valve and the third branch line is closed, and
the coolant is circulated to the chiller and the battery module along the battery coolant line and the second branch line through operation of the third water pump,
while operation of the first expansion valve stops and the second expansion valve operates so that the expanded refrigerant flows into the chiller through the refrigerant connection line,
the first bypass line is opened through operation of the third valve,
the second bypass line is closed through operation of the fourth valve, and
the third expansion valve is configured to expand the refrigerant and supplies the expanded refrigerant to the heat exchanger.

15. The heat pump system of claim 14,
wherein the third valve is configured to supply the refrigerant to the accumulator through the opened first bypass line such that gaseous refrigerant in the refrigerant supplied to the accumulator is supplied to the compressor, and
wherein the third valve is configured to open the refrigerant line connected to the refrigerant connection line so that the refrigerant is supplied to the chiller.

16. The heat pump system of claim 7,
wherein in the heating and dehumidifying modes of the vehicle, the coolant is circulated to the at least one electrical component through operation of the first water pump,
while the first branch line is opened through operation of the second valve, the first coolant line connecting the at least one electrical component, the at least one motor, and the first radiator is closed, each of operations of the second water pump and the third water pumps stops, and
the refrigerant line connecting the heat exchanger and the evaporator and the refrigerant connection line are closed through operations of the first and second expansion valves,
the first bypass line is opened through operation of the third valve,
the second bypass line is opened through operation of the fourth valve, and
the third expansion valve is configured to expand the refrigerant and supplies each of the heat exchanger and the evaporator through the second bypass line.

17. The heat pump system of claim 2, wherein the second and third expansion valves are electronic expansion valves that selectively expand the refrigerant while controlling the flow of the refrigerant.

18. The heat pump system of claim 1, wherein the heat exchanger includes:
a first heat dissipation unit connected to the first coolant line;
a second heat dissipation unit connected to the second coolant line; and
a partition partitioning the inside of the condenser into the first heat dissipation unit and the second heat dissipation unit to prevent the coolants supplied from the first and second cooling devices, respectively, from being mixed and allowing the refrigerant to pass therethrough.

19. The heat pump system of claim 1, wherein the heat exchanger condenses or evaporates the refrigerant according to the modes of the vehicle.

20. The heat pump system of claim 2, wherein the accumulator is mounted on the refrigerant line between the compressor and the evaporator.

* * * * *